United States Patent
Kaliyamoorthy et al.

(10) Patent No.: US 11,012,369 B2
(45) Date of Patent: May 18, 2021

(54) AGGREGATED SWITCH PATH OPTIMIZATION SYSTEM

(71) Applicant: Dell Products L.P., Round Rock, TX (US)

(72) Inventors: Karthi Kaliyamoorthy, Tamilnadu (IN); Senthil Nathan Muthukaruppan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 16/504,086

(22) Filed: Jul. 5, 2019

(65) Prior Publication Data

US 2021/0006504 A1    Jan. 7, 2021

(51) Int. Cl.
| | |
|---|---|
| *H04L 12/911* | (2013.01) |
| *H04L 12/891* | (2013.01) |
| *H04L 12/931* | (2013.01) |
| *H04L 12/26* | (2006.01) |
| *H04L 12/709* | (2013.01) |
| *H04L 12/707* | (2013.01) |

(52) U.S. Cl.
CPC ........ *H04L 47/748* (2013.01); *H04L 43/0882* (2013.01); *H04L 43/16* (2013.01); *H04L 45/22* (2013.01); *H04L 45/245* (2013.01); *H04L 47/41* (2013.01); *H04L 47/728* (2013.01); *H04L 47/745* (2013.01); *H04L 47/822* (2013.01); *H04L 49/35* (2013.01)

(58) Field of Classification Search
CPC ....... H04L 47/748; H04L 43/16; H04L 47/41; H04L 47/745; H04L 45/245; H04L 47/822; H04L 47/728; H04L 43/0882; H04L 45/22; H04L 49/35
See application file for complete search history.

(56) References Cited

U.S. PATENT DOCUMENTS

| | | | |
|---|---|---|---|
| 8,724,456 B1 * | 5/2014 | Hong | G06F 11/00 370/225 |
| 8,730,963 B1 * | 5/2014 | Grosser, Jr. | H04L 45/245 370/392 |
| 8,780,699 B1 * | 7/2014 | Hasan | H04L 1/22 370/219 |
| 2007/0047436 A1 * | 3/2007 | Arai | H04L 49/552 370/219 |

(Continued)

*Primary Examiner* — Steven H Nguyen
(74) *Attorney, Agent, or Firm* — Haynes and Boone, LLP

(57) ABSTRACT

An aggregated switch path optimization system includes first and second switch devices. An aggregated third switch device is coupled to the first switch device, the second switch device, and an aggregated fourth switch device. The aggregated third switch device forwards those packets from the first switch device via one of: an ICL to the aggregated fourth switch device, and a link to the second switch device. The aggregated third switch device then monitors a usage of the ICL and the availability of the link to the second switch device. In response to the usage of the ICL exceeding a threshold usage level, or an unavailability of the link to the second switch device, the aggregated third switch device transmits a packet redirection message to the first switch device that causes it to redirect packets away from the aggregated third switch device and towards the aggregated fourth switch device.

19 Claims, 19 Drawing Sheets

(56) References Cited

U.S. PATENT DOCUMENTS

| | | | |
|---|---|---|---|
| 2007/0237085 A1* | 10/2007 | Tirumalai | H04L 45/22 370/242 |
| 2010/0020680 A1* | 1/2010 | Salam | H04L 43/0811 370/225 |
| 2012/0287785 A1* | 11/2012 | Kamble | H04L 49/356 370/230.1 |
| 2012/0287939 A1* | 11/2012 | Leu | H04L 49/356 370/409 |
| 2013/0064067 A1* | 3/2013 | Kamath | H04L 49/354 370/218 |
| 2013/0294227 A1* | 11/2013 | Fukuzaki | H04L 1/22 370/228 |
| 2013/0301404 A1* | 11/2013 | Kano | H04L 45/28 370/228 |
| 2014/0010073 A1* | 1/2014 | Shah | H04L 45/58 370/228 |
| 2014/0140346 A1* | 5/2014 | Kumagai | H04L 12/6418 370/392 |
| 2014/0192632 A1* | 7/2014 | Sait | H04L 47/41 370/219 |
| 2015/0319083 A1* | 11/2015 | Grosser, Jr. | H04L 12/4625 370/218 |
| 2016/0269322 A1* | 9/2016 | Nakagawa | H04L 45/22 |
| 2018/0351855 A1* | 12/2018 | Sood | H04L 45/245 |

* cited by examiner

AGGREGATED SWITCH PATH OPTIMIZATION SYSTEM

BACKGROUND

The present disclosure relates generally to information handling systems, and more particularly to utilizing optimized paths provided via aggregated information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are sometime aggregated and utilized to provide for the transmission of data. For example, Virtual Link Trunking (VLT) is a proprietary aggregation protocol available in switch devices provided by DELL® Inc. of Round Rock, Tex., United States, and may be utilized to provide a redundant, load-balancing connection for host devices to a core network in a loop free environment, eliminating the need for the use of the Spanning Tree Protocol (STP). In some configurations, switch devices (i.e., VLT switch devices) are aggregated utilizing the VLT protocol, which includes providing an Inter-Chassis Link (ICL) (also referred to as a VLT interconnect (VLTi) according to the VLT protocol) between those VLT switch devices. The VLT switch devices may then also be coupled to a first host device via a Top Of Rack (TOR) switch device, and coupled to a second host device via a core switch device, or via a directly connection between that second host device and one of the VLT switch devices, and such configurations can result in inefficient data transmissions.

For example, when the VLT switch devices are each connected to a TOR switch device that is coupled to a first host device, and each connected to a core switch device that is coupled to a second host device, a data packet flow generated and transmitted by the first host device may be handled by the switching fabric via the TOR switch device forwarding packets in that data packet flow to a first VLT switch device, and that first VLT switch device forwarding packets in that data packet flow to the core switch device for provisioning to the second host device. However, in the event the link between the first switch device and the core switch device becomes unavailable, the data packet flow generated and transmitted by the first host device may be handled by the switching fabric via the TOR switch device forwarding packets in that data packet flow to the first VLT switch device, that first VLT switch device forwarding packets in that data packet flow over the ICL/VLTi to a second VLT switch device, and that second VLT switch device forwarding packets in that data packet flow to the core switch device for provisioning to the second host device. As will be appreciated by one of skill in the art, such data packet flow handling provides a non-optimal path for the packets that utilizes the ICL/VLTi (i.e., relative to an optimal path that has the TOR switch device forward packets in the data packet flow directly to the second VLT switch device for provisioning to the second host device via the core switch device), and subjects those packets to the possibility of loss when the ICL/VLTi is oversubscribed.

In another example, when the VLT switch devices are each connected to a Top Of Rack (TOR) switch device that is coupled to a first host device, and include a first VLT switch device that is directly connected to a second host device (e.g., via an orphan port on the first VLT switch device), a data packet flow generated and transmitted by the first host device may be handled by the switching fabric via the TOR switch device performing a hashing operation on any particular packet received in the data packet flow in order to determine whether to forward that packet to the first VLT switch device or a second VLT switch device. When the first VLT switch device receives packets from the TOR switch device, it forwards those packets to the directly connected second host device. However, when the second VLT switch device receives packets from the TOR switch device, it forwards those packets over the ICL/VLTi to the first VLT switch device (for provisioning to the second host device directly connected to that first VLT switch device.) As such, in situations where the hashing operations by the TOR switch device provide packets in the data packet flow to the second VLT switch device, a non-optimal path for the packets is provided that utilizes the ICL/VLTi (i.e., relative to an optimal path that has the TOR switch device forward packets in the data packet flow directly to the first VLT switch device for provisioning to the directly connected second host device), and subjects those packets to the possibility of loss when the ICL/VLTi is oversubscribed.

Accordingly, it would be desirable to provide an aggregated switch path optimization system.

SUMMARY

According to one embodiment, an Information Handling System (IHS) includes a processing system; and a memory system that is coupled to the processing system and that includes instructions that, when executed by the processing system, cause the processing system to provide an aggregated switch engine that is configured to: receive packets from a first switch device and forward those packets via one of: an Inter-Chassis Link (ICL) to an aggregated second switch device; and a link to a third switch device; monitor a usage level of the ICL; and monitor an availability of the link to the third switch device and, in response to identifying either of a usage level of the ICL that exceeds a threshold usage level or an unavailability of the link to the third switch device: generate and transmit a first packet redirection message to the first switch device that is configured to cause the first switch device to redirect packets away from the Information Handling System (IHS) and towards the aggregated second switch device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
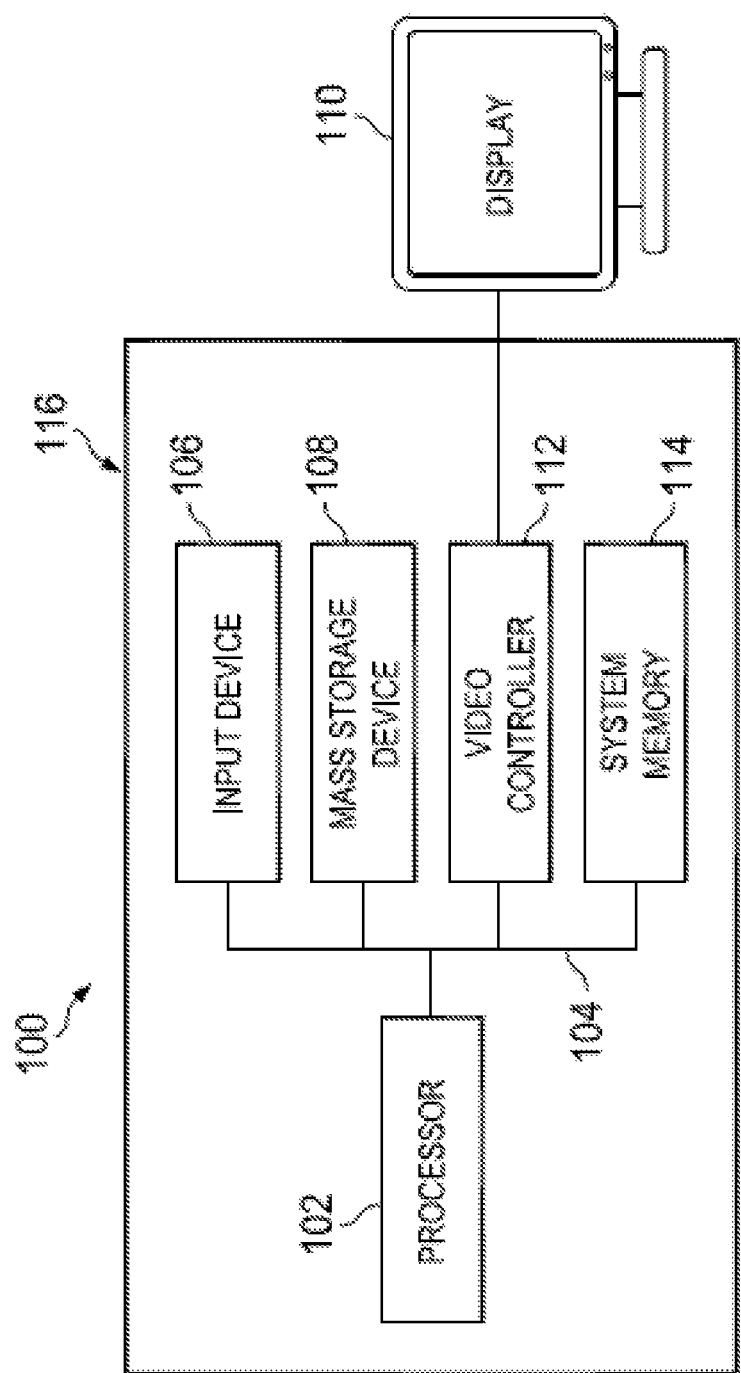
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
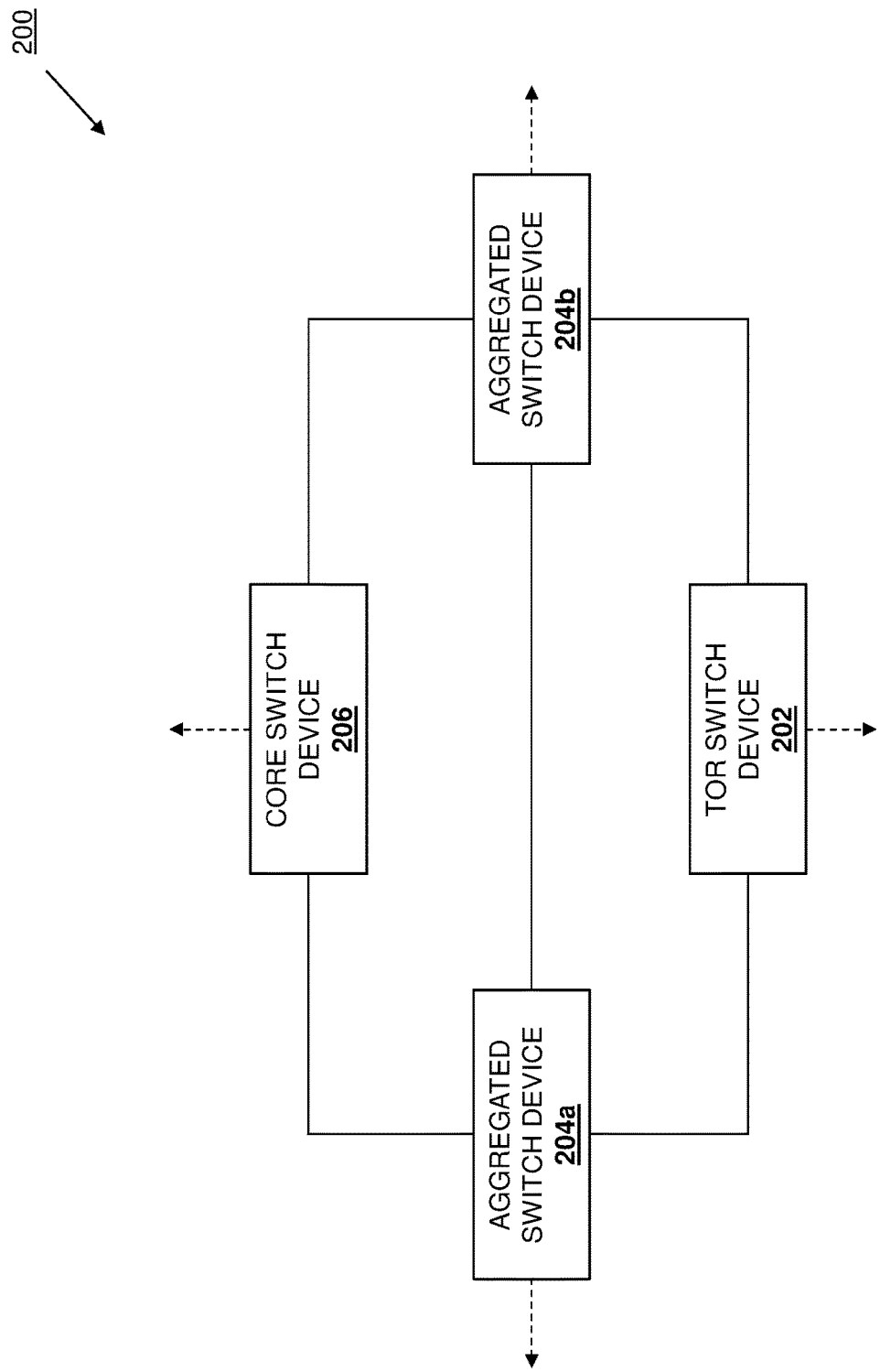
FIG. 2 is a schematic view illustrating an embodiment of an aggregated switch path optimization system.

Referring now to FIG. 2, an embodiment of an aggregated switch path optimization system 200 is illustrated. In the illustrated embodiment, the aggregated switch path optimization system 200 incudes a Top Of Rack (TOR) switch device 202 that one of skill in the art in possession of the present disclosure will recognize may be provided by a variety of switch devices that are located in a server rack (e.g., in a datacenter) and that may be coupled to host devices such as server devices (as indicated by the dashed arrow extending from the TOR switch device 200 in FIG. 2.) In an embodiment, the TOR switch device 202 may be provided by the IHS 100 discussed above with reference to FIG. 1, and/or may include some or all of the components of the IHS 100. However, while illustrated and discussed as a TOR switch device, one of skill in the art in possession of the present disclosure will recognize that the TOR switch device 202 provided in the aggregated switch path optimization system 200 may include any devices that may be configured to operate similarly as the TOR switch device 202 discussed below.

In the illustrated embodiment, the aggregated switch path optimization system 200 also incudes a plurality of aggregated switch devices such as the aggregated switch devices 204a and 204b in FIG. 2 that one of skill in the art in possession of the present disclosure will recognize may be provided by a variety of switch devices that may be coupled to host devices such (as indicated by the respective dashed arrow extending from the aggregated switch device 204*a* and 204*b* in FIG. 2.) In the examples provided below, the VLT protocol is utilized to provide the aggregated switch devices 204*a* and 204*b* as a first VLT switch device and a second VLT switch device (e.g., a pair of VLT peers), respectively. However, one of skill in the art in possession of the present disclosure will recognize that other aggregation protocols may be utilized to provide the aggregated switch devices 204*a* and 204*b* while remaining within the scope of the present disclosure as well. In an embodiment, either or both of the aggregated switch devices 204*a* and 204*b* may be provided by the IHS 100 discussed above with reference to FIG. 1, and/or may include some or all of the components of the IHS 100. However, while illustrated and discussed as VLT switch devices, one of skill in the art in possession of the present disclosure will recognize that VLT switch device 204*a* and 204*b* provided in the aggregated switch path optimization system 200 may include any devices that may be configured to operate similarly as the VLT switch devices 204*a* and 204*b* discussed below. In some examples, each of the aggregated switch devices 204*a* and 204*b* and the TOR switch device 202 may include the same (or a similar) operating system that provides each of those switch devices with the packet redirection functionality discussed below.

In the illustrated embodiment, the aggregated switch path optimization system 200 also incudes a core switch device 206 that one of skill in the art in possession of the present disclosure will recognize may be provided by a variety of switch devices that may be coupled to host devices such as server devices (as indicated by the dashed arrow extending from the core switch device 206 in FIG. 2.) In an embodiment, the core switch device 206 may be provided by the IHS 100 discussed above with reference to FIG. 1, and/or may include some or all of the components of the IHS 100. However, while illustrated and discussed as a core switch device, one of skill in the art in possession of the present disclosure will recognize that core switch device 206 provided in the aggregated switch path optimization system 200 may include any devices that may be configured to operate similarly as the core switch device 206 discussed below.

In the specific example, illustrated in FIG. 2, the aggregated switch devices 204*a* and 204*b* are each connected via a respective link to the TOR switch device 202, which one of skill in the art in possession of the present disclosure will recognize may be provided as an aggregated link (e.g., a VLT Link Aggregation Group (LAG)) from the TOR switch device 202 to the aggregated switch devices 204*a* and 204*b* that includes a VLT port-channel interface on the TOR switch device 202 that spans respective ports channels in the aggregated switch devices 204*a-b*/VLT switch devices/VLT peers that are members of that VLT port-channel interface. Similarly, the aggregated switch devices 204*a* and 204*b* are each connected via a respective link to the core switch device 206, which one of skill in the art in possession of the present disclosure will recognize may be provided as an aggregated link (e.g., a VLT Link Aggregation Group (LAG)) from the core switch device 206 to the aggregated switch devices 204*a* and 204*b* that includes a VLT port-channel interface on the core switch device 206 that spans respective port channels in the aggregated switch devices 204*a-b*/VLT switch devices/VLT peers that are members of that VLT port-channel interface.

Furthermore, the aggregated switch devices 204*a* and 204*b* are coupled together by one or more links that may be aggregated into an Inter-Chassis Link (ICL) (e.g., a VLTi) that provides dedicated link(s) between the VLT peers that may be utilized to exchange control information, as well as data in some embodiments discussed below. As will be appreciated by one of skill in the art in possession of the present disclosure, the aggregated switch devices 204*a* and 204*b* and the ICL (e.g., the VLT peers connected by the VLTi) may be considered a VLT domain. While a specific aggregated switch path optimization system 200 has been illustrated and described, one of skill in the art in possession of the present disclosure will recognize that the aggregated switch path optimization system 200 of the present disclosure may include a variety of components and component configurations while remaining within the scope of the present disclosure as well.

Figure 3:
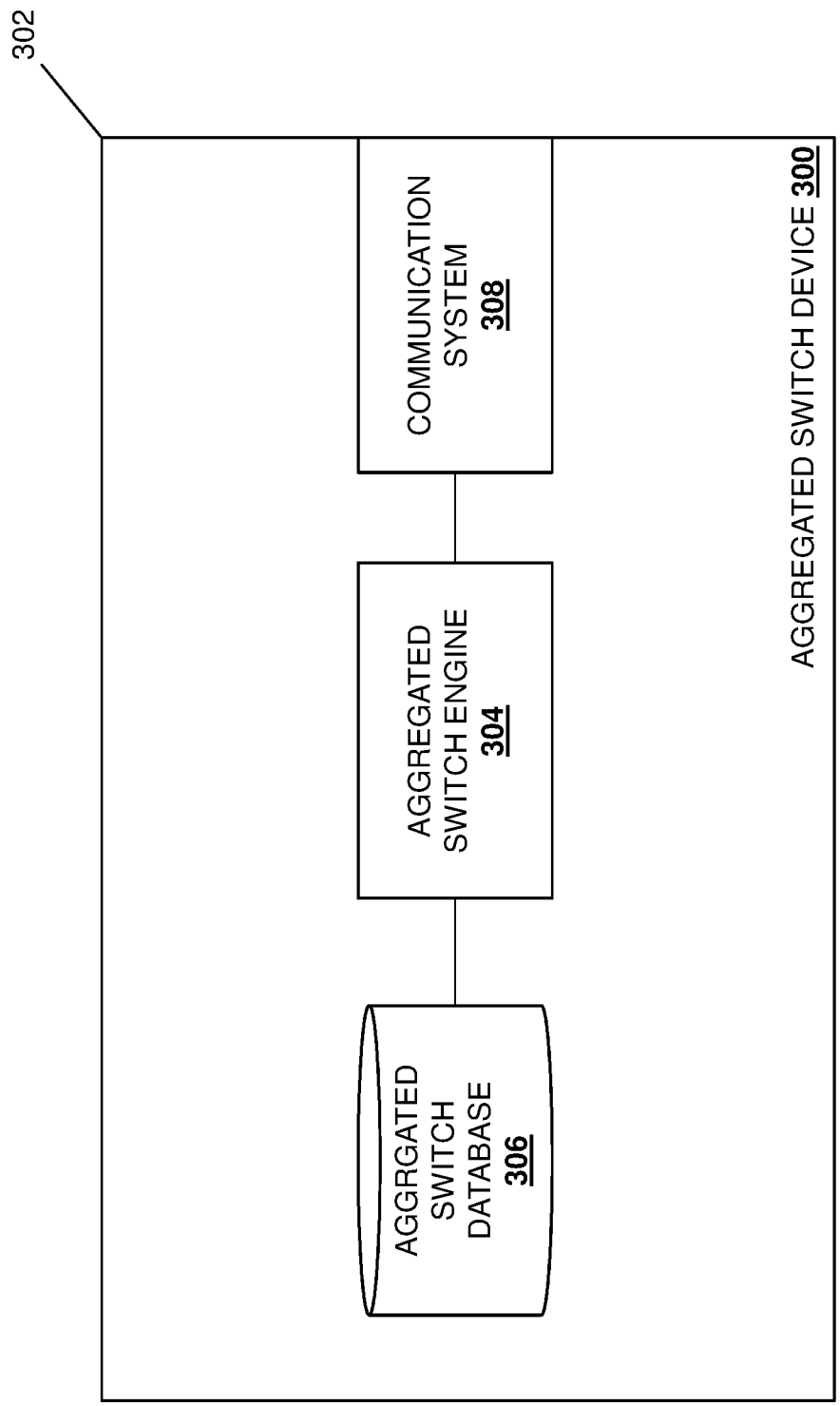
FIG. 3 is a schematic view illustrating an embodiment of an aggregated switch device that may be included in the aggregated switch path optimization system of FIG. 2.

Referring now to FIG. 3, an embodiment of an aggregated switch device 300 is illustrated that may provide either or both of the aggregated switch devices 204*a* and 204*b* discussed above with reference to FIG. 2. As such, the aggregated switch device 300 may be provided by the IHS 100 discussed above with reference to FIG. 1 and/or may include some or all of the components of the IHS 100. Furthermore, while illustrated and discussed as an aggregated switch device provided via the VLT protocol (e.g., a VLT peer), one of skill in the art in possession of the present disclosure will recognize that the functionality of the aggregated switch device 300 discussed below may be provided by other devices that are configured to operate similarly as the aggregated switch device 300 discussed below. In the illustrated embodiment, the aggregated switch device 300 includes a chassis 302 that houses the components of the aggregated switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an aggregated switch engine 304 that is configured to perform the functionality of the aggregated switch engines and/or aggregated switch devices discussed below.

The chassis 302 may also house a storage system (not illustrated, but which may include the storage 108 discussed above with reference to FIG. 1) that is coupled to the aggregated switch engine 304 (e.g., via a coupling between the storage system and the processing system) and that includes an aggregated switch database 306 that is configured to store any of the information utilized by the aggregated switch engine 304 discussed below. The chassis 302 may also house a communication system 308 that is coupled to the aggregated switch engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 308 may include any of the ports on the aggregated switch devices 204*a-b*/300 discussed below. However, while a specific aggregated switch device 300 has been illustrated, one of skill in the art in possession of the present disclosure will recognize that aggregated switch devices (or other devices operating according to the teachings of the present disclosure in a manner similar to that described below for the aggregated switch device 300) may include a variety of components and/or component configurations for providing conventional switch device functionality, as well as the functionality discussed below, while remaining within the scope of the present disclosure as well.

Figure 4:
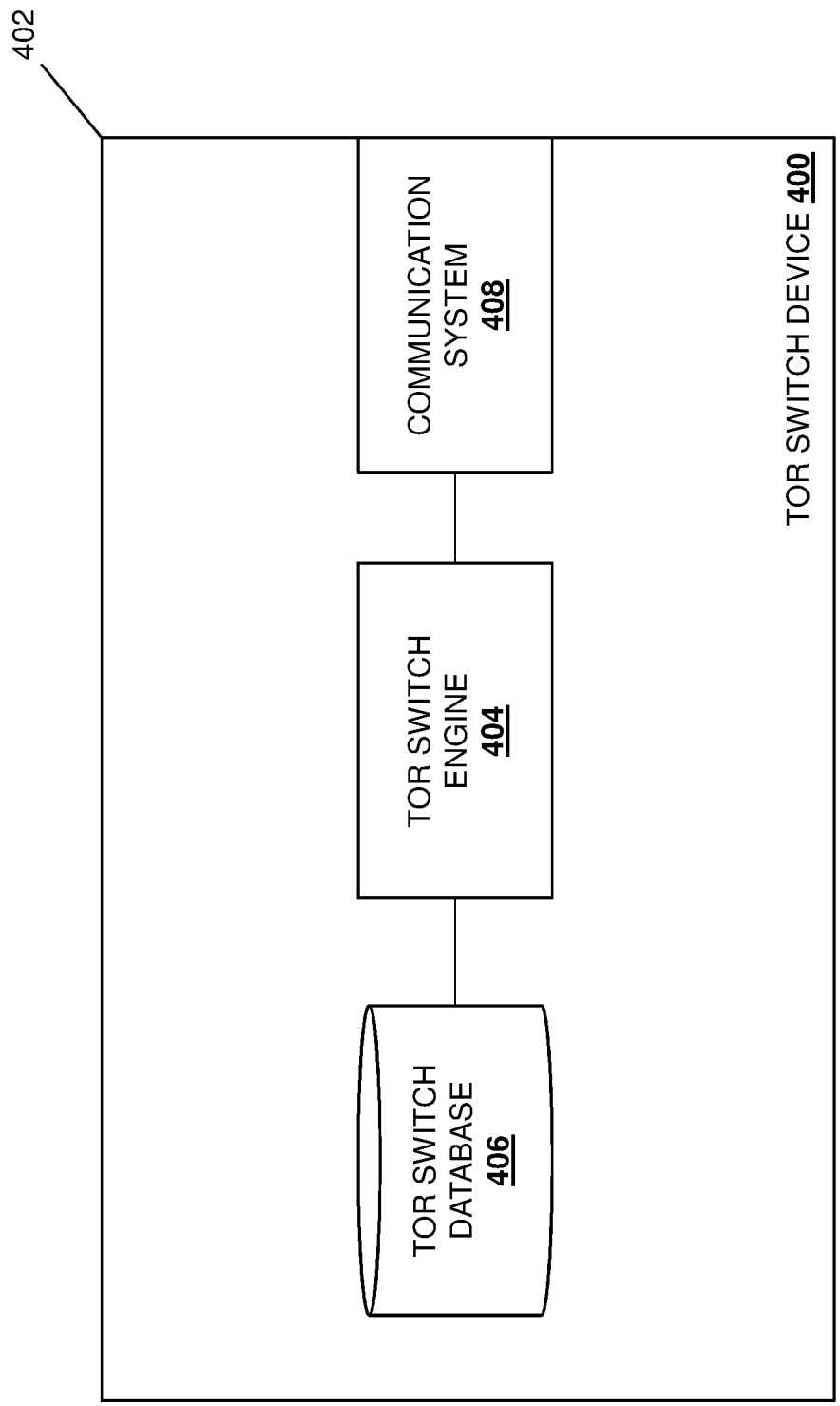
FIG. 4 is a schematic view illustrating an embodiment of a TOR switch device that may be included in the aggregated switch path optimization system of FIG. 2.

Referring now to FIG. 4, an embodiment of a TOR switch device 400 is illustrated that may provide the TOR switch device 202 discussed above with reference to FIG. 2. As such, the TOR switch device 400 may be provided by the IHS 100 discussed above with reference to FIG. 1 and/or may include some or all of the components of the IHS 100. Furthermore, while illustrated and discussed as TOR switch device, one of skill in the art in possession of the present disclosure will recognize that the functionality of the TOR switch device 400 discussed below may be provided by other devices that are configured to operate similarly as the TOR switch device 400 discussed below. In the illustrated embodiment, the TOR switch device 400 includes a chassis 402 that houses the components of the TOR switch device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a TOR switch engine 404 that is configured to perform the functionality of the TOR switch engines and/or TOR switch devices discussed below.

The chassis 402 may also house a storage system (not illustrated, but which may include the storage 108 discussed above with reference to FIG. 1) that is coupled to the TOR switch engine 404 (e.g., via a coupling between the storage system and the processing system) and that includes a TOR switch database 406 that is configured to store any of the information utilized by the TOR switch engine 404 discussed below. The chassis 402 may also house a communication system 408 that is coupled to the TOR switch engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 408 may include any of the ports on the TOR switch device 202/400 discussed below. However, while a specific TOR switch device 400 has been illustrated, one of skill in the art in possession of the present disclosure will recognize that TOR switch device (or other devices operating according to the teachings of the present disclosure in a manner similar to that described below for the TOR switch device 400) may include a variety of components and/or component configurations for providing conventional switch device functionality, as well as the functionality discussed below, while remaining within the scope of the present disclosure as well.

Figure 5:
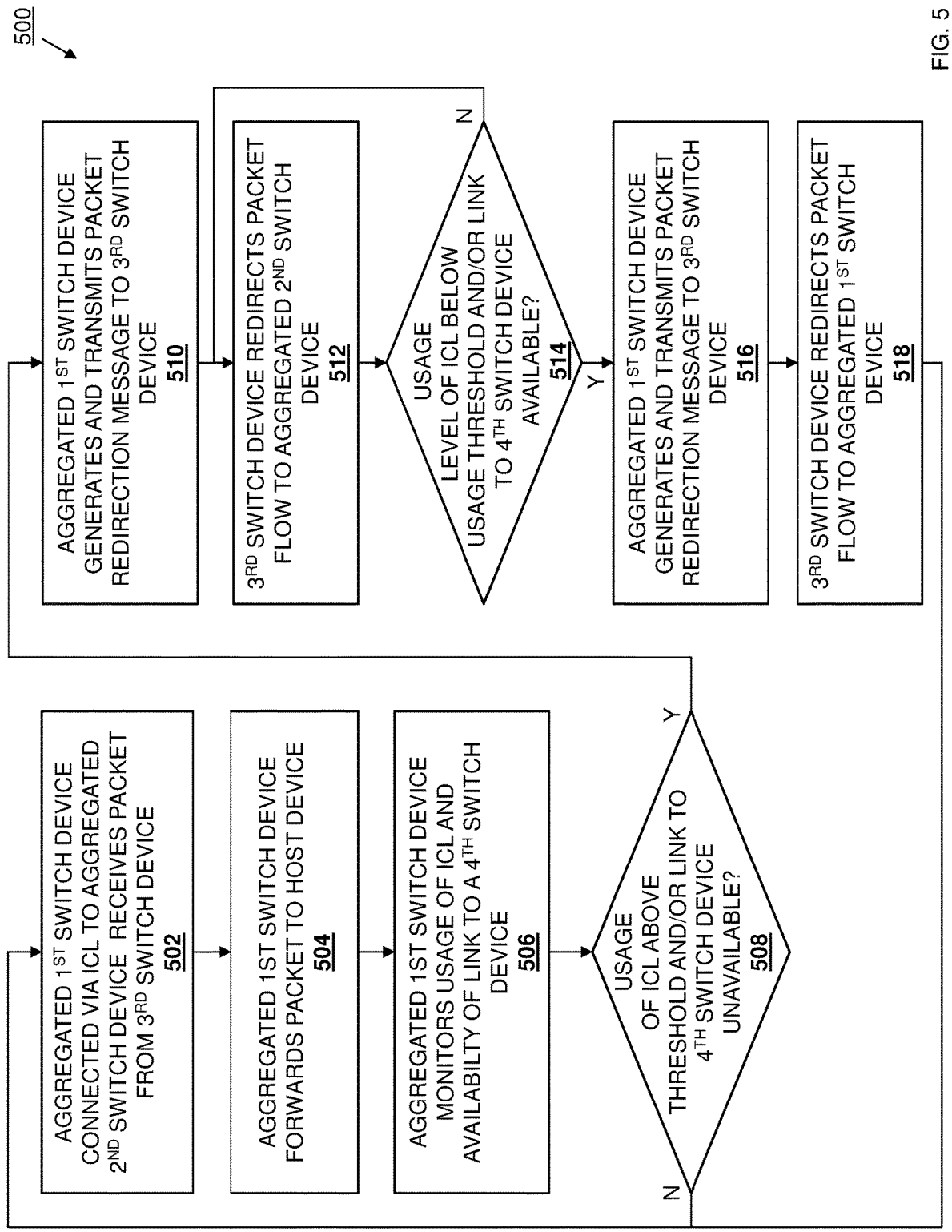
FIG. 5 is a flow chart illustrating an embodiment of a method for providing an optimized path via aggregated switches.

Referring now to FIG. 5, an embodiment of a method 500 for providing an optimized path via aggregated switches is illustrated. As discussed below, the systems and methods of the present disclosure provide for the proactive monitoring of links to aggregated switch devices and, based on that monitoring, enable the redirection of packet flows to those aggregated switch devices in a manner that provides for optimized paths for those packets flows, as well as more efficient utilization of ICLs between the aggregated switch devices. This may be accomplished by a first VLT switch device that is coupled to a second VLT switch device via a VLTi, and that receives packets from a TOR switch device and forwards those packets via one of the VLTi and a link to a core switch device. The first VLT switch device then monitors a usage level of the VLTi and an availability of the link to the core switch device. In response to identifying either of a usage level of the VLTi that exceeds a threshold usage level or an unavailability of the link to the core switch device (each of which are indicative of packets being transmitted along a non-optimal path due to a failed link between the first VLT switch device and the core switch device, or inefficient packet hashing by the TOR switch device), the first VLT switch device may generate and transmit a packet redirection message to the TOR switch device that is configured to cause the TOR switch device to redirect packets away from the first VLT switch device and towards the second VLT switch device, which provides a more optimal path for the packets in that packet flow and reduces the utilization of VLTi.

Figure 6:
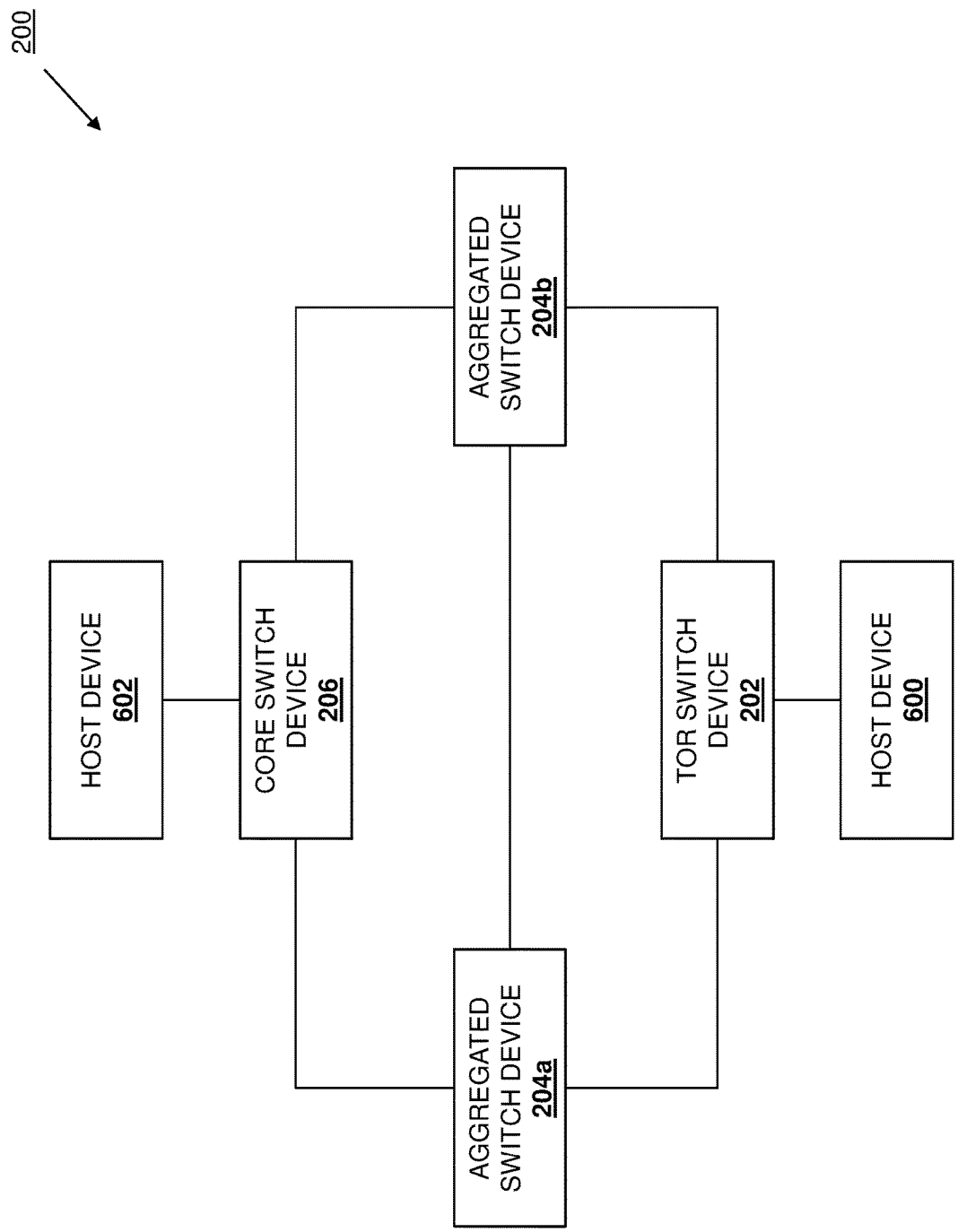
FIG. 6 is a schematic view illustrating an embodiment of the aggregated switch path optimization system of FIG. 2 provided in a first host device configuration during the method of FIG. 5.

With reference to FIG. 6 and the examples illustrated in FIGS. 7A, 7B, 7C, and 7D, a first host device configuration is illustrated in which a host device 600 is connected to the TOR switch device 202, and a host device 602 is coupled to the core switch device 602. For example, the host switch device 600 may be provided by a server device in a rack that includes the TOR switch device 202, and thus may be connected to the TOR switch device 202 via a variety of server device/TOR switch device couplings known in the art. In another example, the host device 602 may be server device that is coupled through a network (e.g., the Internet, a Local Area Network (LAN), etc.) to the core switch device 206, and thus may be coupled to the core switch device 206 via a variety of server device/network/core switch device couplings known in the art. In the examples provided below, either or both of the host devices 600 and 602 may be provided by the IHS 100 discussed above with reference to FIG. 1 and/or may include some or all of the components of the IHS 100, and one of skill in the art in possession of the present disclosure will recognize that, while the host devices 600 and 602 are described below as server devices, other devices (e.g., storage devices, desktop computing devices, laptop/notebook computing devices, tablet computing devices, mobile phones, etc.) will fall within the scope of the present disclosure as well.

Figure 8:
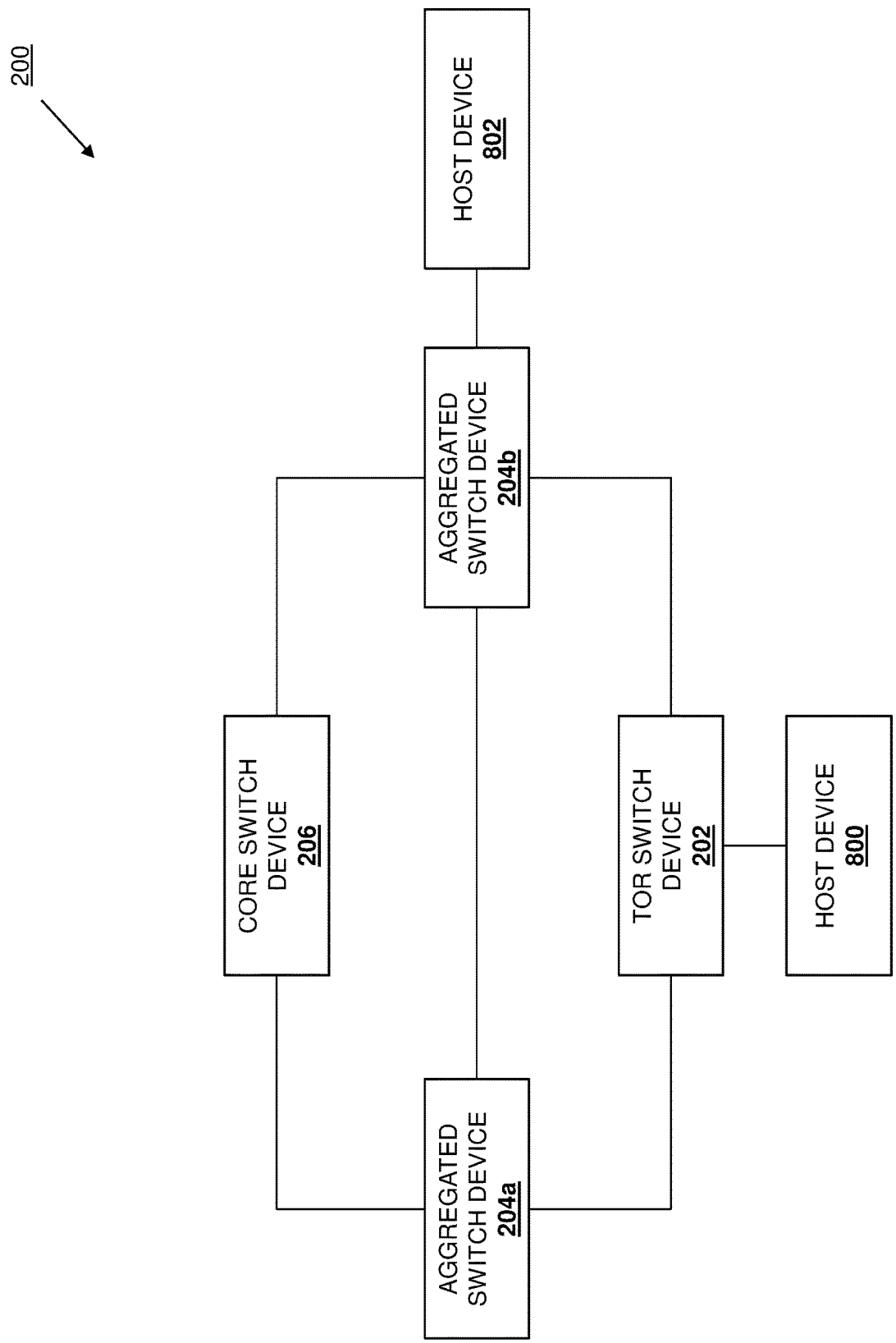
FIG. 8 is a schematic view illustrating an embodiment of the aggregated switch path optimization system of FIG. 2 provided in a second host device configuration during the method of FIG. 5.

With reference to FIG. 8 and the examples illustrated in FIGS. 9A, 9B, 9C, and 9D, a second host device configuration is illustrated in which a host device 800 is connected to the TOR switch device 202, and a host device 802 is connected to the aggregated switch device 204b. For example, the host switch device 800 may be provided by a server device in a rack that includes the TOR switch device 202, and thus may be connected to the TOR switch device 202 via a variety of server device/TOR switch device couplings known in the art. In another example, the host device 802 may be server device that is connected to the aggregated switch device 204b, and thus may be coupled to the aggregated switch device 204b via a variety of server device/aggregated switch device couplings known in the art. In a specific example, the host device 802 may be coupled to an orphan port on the aggregated switch device 204b. As will be appreciated by one of skill in the art in possession of the present disclosure, orphan ports in a VLT switch system (e.g., provided by the aggregated switch devices/VLT switch devices 204a and 204b) may be ports on the VLT switch devices that are not part of the VLT (e.g., non-VLT ports) and thus are not connected to a VLT port channel in the VLT switch device.

In the examples provided below, either or both of the host devices 800 and 802 may be provided by the IHS 100 discussed above with reference to FIG. 1 and/or may include some or all of the components of the IHS 100, and one of skill in the art in possession of the present disclosure will recognize that, while the host devices 800 and 802 are described below as server devices, other devices (e.g., storage devices, desktop computing devices, laptop/notebook computing devices, tablet computing devices, mobile phones, etc.) will fall within the scope of the present disclosure as well. However, while two specific host device configurations have been illustrated and described, one of skill in the art in possession of the present disclosure will recognize that a variety of host device configurations will benefit from the teachings of the present disclosure and thus will fall within its scope as well.

Figure 7A:
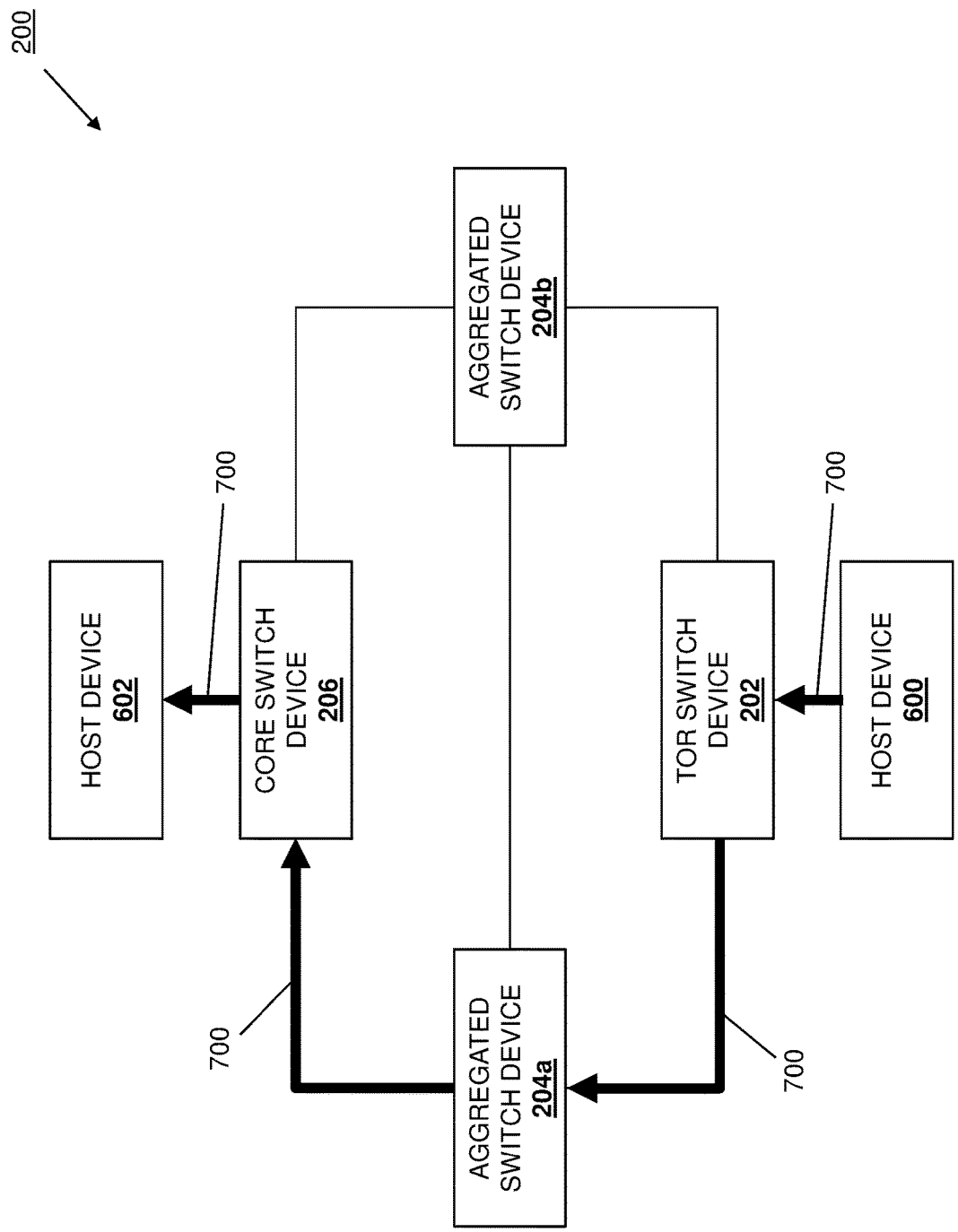
FIG. 7A is a schematic view illustrating an embodiment of the transmission of packets via the aggregated switch path optimization system of FIG. 6 during the method of FIG. 5.

The method 500 begins at block 502 where an aggregated first switch device that is connected via an Inter-Chassis Link (ICL) to an aggregated second switch device receives a packet from a third switch device. With reference to FIGS. 6 and 7A, in an embodiment of block 502, the host device 600 may generate and transmit a data packet 700 to the TOR switch device 202. At block 502, the TOR switch engine 404 in the TOR switch device 202/400 may receive that data packet 700 via its communication system 408 and process that data packet 700 to determine that the data packet 700 should be forwarded to the aggregated switch device 204a, as also illustrated in FIG. 7A. As would be appreciated by one of skill in the art in possession of the present disclosure, the data packet 700 may be part of a data packet flow that is identified in the TOR switch device 202 and that causes the TOR switch engine 404 in the TOR switch device 202/400 to forward data packets in that data packet flow to the aggregated switch device 204a. As such, the processing of the data packet 700 by the TOR switch engine 404 in the TOR switch device 202/400 may include identifying the data packet 700 as part of the data packet flow that provides for the forwarding of that data packet 700 to the aggregated switch device 204a and, in response, forwarding that data packet 700 to the aggregated switch device 204a via its communication engine 408. Thus, at block 502, the aggregated switch engine 304 in the aggregated switch device 204a/300 may receive that data packet 700 via its communication system 308.

Figure 7B:
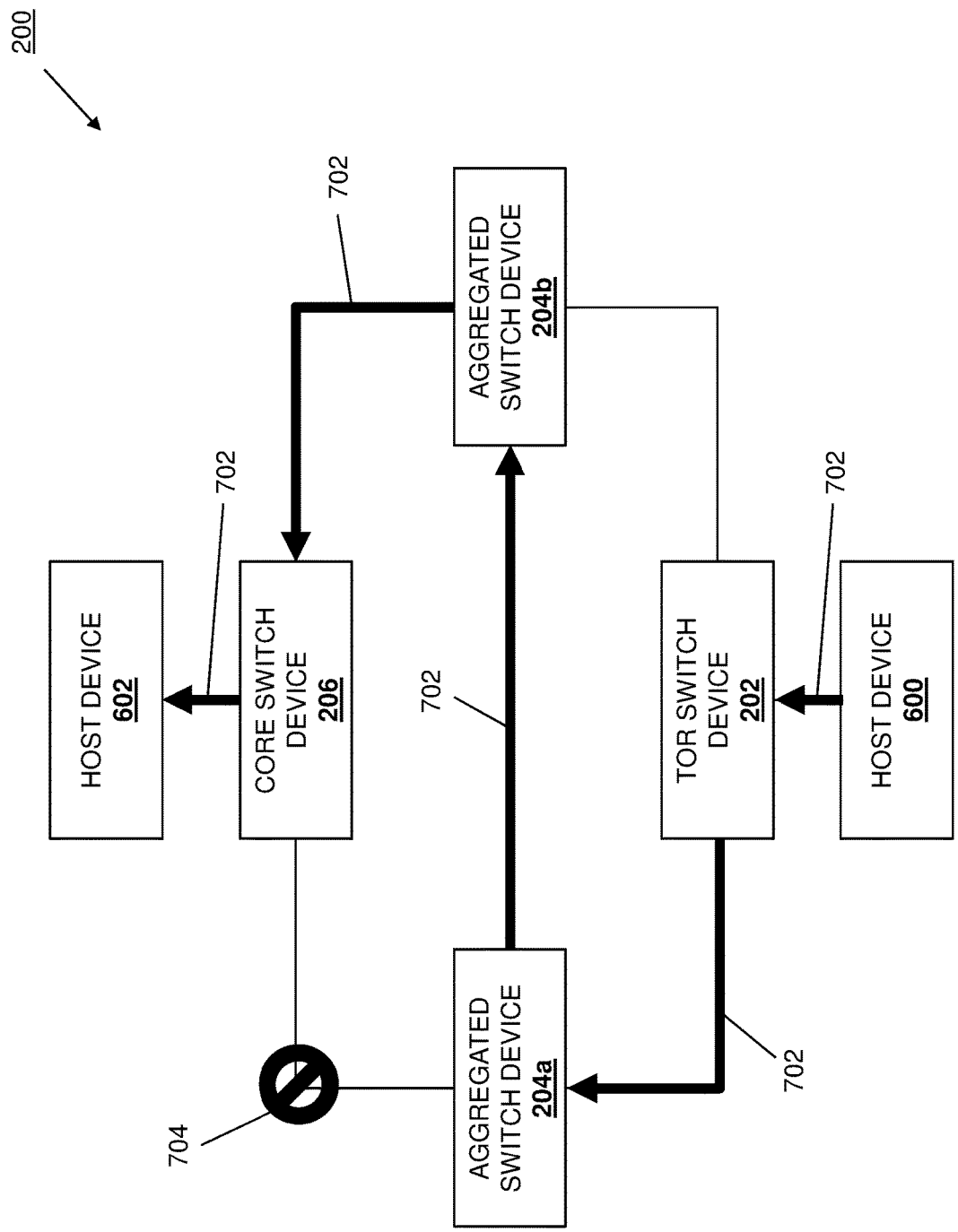
FIG. 7B is a schematic view illustrating an embodiment of the transmission of packets via the aggregated switch path optimization system of FIG. 6 during the method of FIG. 5.

With reference to FIGS. 6 and 7B, in an embodiment of block 502, the host device 600 may generate and transmit a data packet 702 to the TOR switch device 202. At block 502, the TOR switch engine 404 in the TOR switch device 202/400 may receive that data packet 700 via its communication system 408 and process that data packet 702 to determine that the data packet 702 should be forwarded to the aggregated switch device 204a, as also illustrated in FIG. 7B. As discussed above, the data packet 702 may be part of a data packet flow that is identified in the TOR switch device 202 and that causes the TOR switch engine 404 in the TOR switch device 202/400 to forward data packets in that data packet flow to the aggregated switch device 204a. As such, the processing of the data packet 702 by the TOR switch engine 404 in the TOR switch device 202/400 may include identifying the data packet as part of the data packet flow that provides for the forwarding of that data packet 702 to the aggregated switch device 204a and, in response, forwarding that data packet 702 to the aggregated switch device 204a via its communication system 408. Thus, at block 502, the aggregated switch engine 304 in the aggregated switch device 204a/300 may receive that data packet 702 via its communication system 308.

Figure 9A:
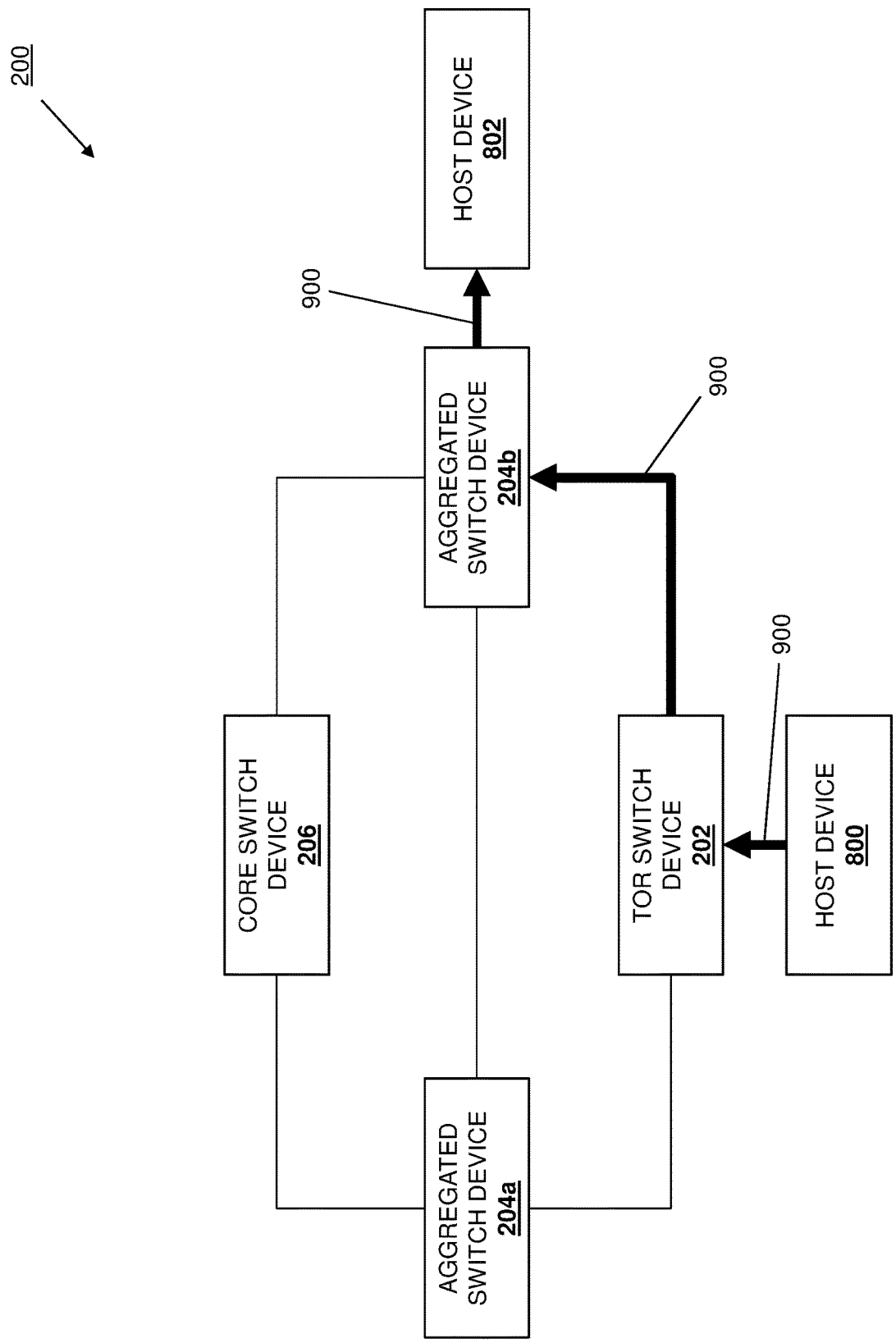
FIG. 9A is a schematic view illustrating an embodiment of the transmission of packets via the aggregated switch path optimization system of FIG. 8 during the method of FIG. 5.

With reference to FIGS. 8 and 9A, in an embodiment of block 502, the host device 800 may generate and transmit a data packet 900 to the TOR switch device 202. At block 502, the TOR switch engine 404 in the TOR switch device 202/400 may receive that data packet 900 via its communication system 408 and process that data packet 900 to determine to which of the aggregated switch devices 204a and 204b that the data packet 900 should be forwarded in order to, for example, provide for the load balancing of data packets forwarded to the aggregated switch devices 204a and 204b. As would be appreciated by one of skill in the art in possession of the present disclosure, upon receiving data packets from the host device 800, the TOR switch engine 404 in the TOR switch device 202/400 may perform a hashing operation that operates to identify which of the aggregated switch devices 204a and 204b to which to forward data packets. As such, FIG. 9A illustrates a situation in which the hashing operation identifies the aggregated switch device 204b for forwarding the data packet 900, and the TOR switch engine 404 in the TOR switch device 202/400 may forward that data packet 900 to the aggregated switch device 204b via its communication system 408. Thus, at block 502, the aggregated switch engine 304 in the aggregated switch device 204b/300 may receive that data packet 900 via its communication system 308.

Figure 9B:
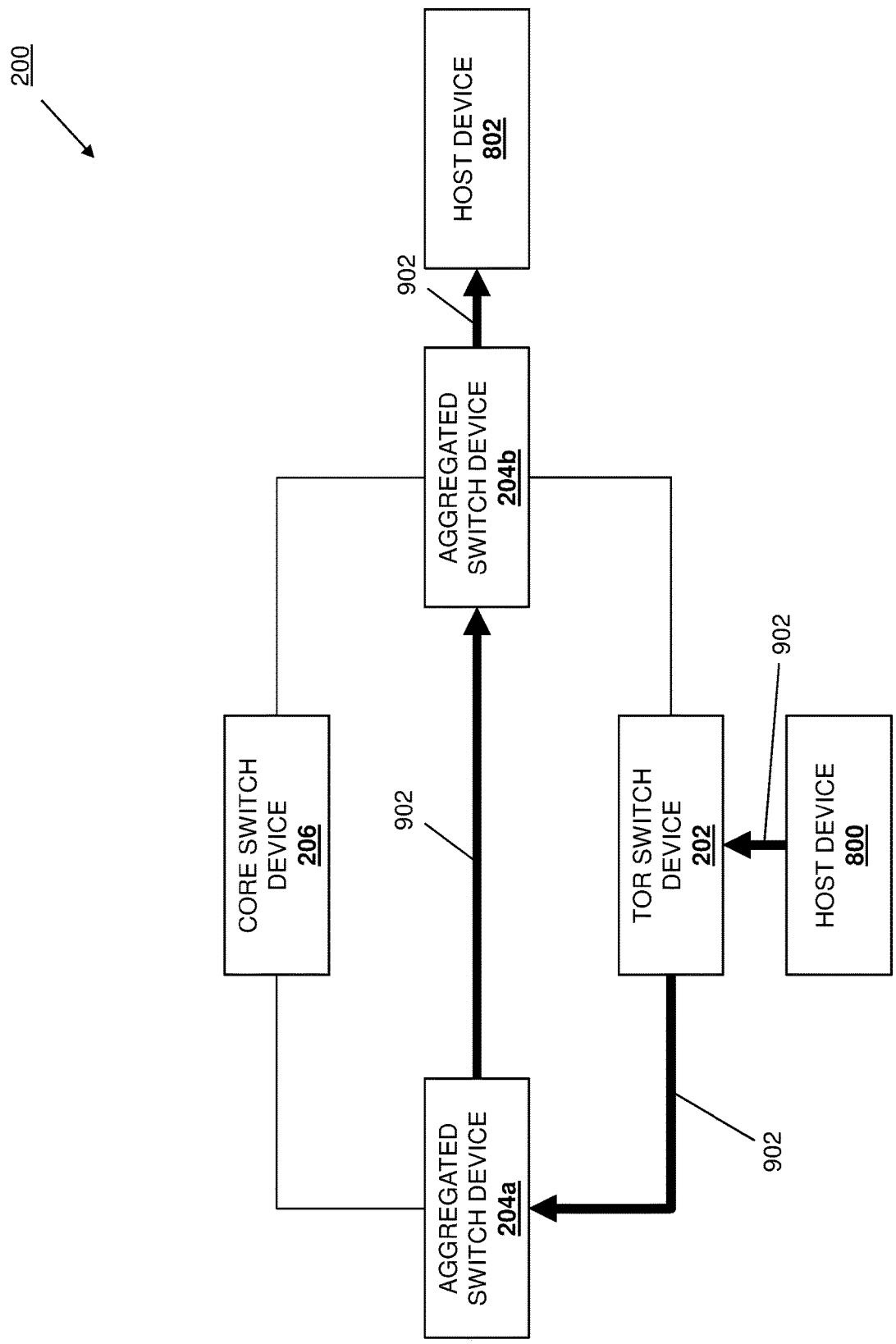
FIG. 9B is a schematic view illustrating an embodiment of the transmission of packets via the aggregated switch path optimization system of FIG. 8 during the method of FIG. 5.

With reference to FIGS. 8 and 9B, in another embodiment of block 502, the host device 800 may generate and transmit a data packet 902 to the TOR switch device 202. At block 502, the TOR switch engine 404 in the TOR switch device 202/400 may receive that data packet 902 via its communication system 408 and process that data packet 902 to determine to which of the aggregated switch devices 204a and 204b that the data packet 900 should be forwarded in order to, for example, provide for the load balancing of data packets forwarded to the aggregated switch devices 204a and 204b. Similarly as discussed above, upon receiving data packets from the host device 800, the TOR switch engine 404 in the TOR switch device 202/400 may perform a hashing operation that operates to identify which of the aggregated switch devices 204a and 204b to which to forward data packets. As such, FIG. 9B illustrates a situation in which the hashing operation identifies the aggregated switch device 204a for forwarding the data packet 902, and the TOR switch engine 404 in the TOR switch device 202/400 may forward that data packet 902 to the aggregated switch device 204a via its communication system 408. Thus, at block 502, the aggregated switch engine 304 in the aggregated switch device 204a/300 may receive that data packet 902 via its communication system 308.

The method 500 then proceeds to block 504 where the aggregated first switch device forwards the packet to a host device. Continuing with the example above that references FIGS. 6 and 7A, in an embodiment of block 504 and in situations in which the link between the aggregated switch device 204a and the core switch device 206 is available, the aggregated switch engine 304 in the aggregated switch device 204a/300 may process the data packet 700 received from the TOR switch device 202 at block 502 and determine that the data packet 700 should be forwarded to the core switch device 206, as also illustrated in FIG. 7A. As would be appreciated by one of skill in the art in possession of the present disclosure, the data packet 700 may be directed to the host device 602 (e.g., via a destination address of the host device 602 included in that data packet 700), which may cause the aggregated switch engine 304 in the aggregated switch device 204a/300 to forward the data packet 700 to the core switch device 206. As such, the processing of the data packet 700 by the aggregated switch engine 304 in the aggregated switch device 204a/300 may include identifying the host device 602 as a destination of the data packet 700 and determining that the host device 602 is reachable via the core switch device 206, and forwarding that data packet 700 to the core switch device 206 via its communication system 308. Thus, at block 504, the core switch device 206 may receive that data packet 700 and forward it to the host device 602 using techniques that would be apparent to one of skill in the art in possession of the present disclosure. One of skill in the art in possession of the present disclosure will recognize that the path of the data packet 700 illustrated in FIG. 7A may be considered an optimized path between the host devices 600 and 602 that does not utilize the ICL between the aggregated switch devices 204a and 204b, allowing the bandwidth of the ICL to be utilized to exchange control information.

Continuing with the example above that references FIGS. 6 and 7B, in an embodiment of block 504 and in situations in which the link between the aggregated switch device 204a and the core switch device 206 is unavailable (as illustrated by element 704 in FIG. 7B), the aggregated switch engine 304 in the aggregated switch device 204a/300 may process the data packet 702 received from the TOR switch device 202 at block 502 and determine that the data packet 702 should be forwarded to the core switch device 206 which, due to the unavailability of the link between the aggregated switch device 204a and the core switch device 206, causes the aggregated switch engine 304 in the aggregated switch device 204a/300 to forward the data packet over the ICL to the aggregated switch device 204b, as also illustrated in FIG. 7B. As would be appreciated by one of skill in the art in possession of the present disclosure, the data packet 702 may be directed to the host device 602 (e.g., via a destination address of the host device 602 included in that data packet 702), which may cause the aggregated switch engine 304 in the aggregated switch device 204a/300 to forward the data packet 702 to the aggregated switch device 204b.

As such, the processing of the data packet 702 by the aggregated switch engine 304 in the aggregated switch device 204a/300 may include identifying the host device 602 as a destination of the data packet 702, determining that the host device 602 is reachable via the core switch device 206 but that the direct link to the core switch device 206 is unavailable, and forwarding that data packet 702 to the aggregated switch device 204b via its communication system 308. Thus, at block 504 and as illustrated in FIG. 7B, the aggregated switch engine 204 in the aggregated switch device 204b/300 may receive that data packet 702 via its communication system 308 and forward that data packet 702 to the core switch device 206 in a manner similar to that described above, which allows the core switch device to forward the data packet 702 to the host device 602 using techniques that would be apparent to one of skill in the art in possession of the present disclosure. One of skill in the art in possession of the present disclosure will recognize that the path of the data packet 702 illustrated in FIG. 7B may be considered a non-optimized path between the host devices 600 and 602 that utilizes the ICL between the aggregated switch devices 204a and 204b, using up bandwidth of the ICL that could otherwise be utilized for the exchange of control information.

Continuing with the example above that references FIGS. 8 and 9A, in an embodiment of block 504 and in situations in which the hashing operations by the TOR switch device 202 have resulted in the forwarding of the data packet 900 to the aggregated switch device 204b, the aggregated switch engine 304 in the aggregated switch device 204b/300 may process the data packet 900 received from the TOR switch device 202 at block 502 and determine that the data packet 900 should be forwarded to the host device 802, as also illustrated in FIG. 9A. As would be appreciated by one of skill in the art in possession of the present disclosure, the data packet 900 may be directed to the host device 802 (e.g., via a destination address of the host device 802 included in that data packet 900), which may cause the aggregated switch engine 304 in the aggregated switch device 204b/300 to forward the data packet 900 to the directly connected host device 802 via its communication system 308. As such, the processing of the data packet 900 by the aggregated switch engine 304 in the aggregated switch device 204b/300 may include identifying the host device 802 as a destination of the data packet 900, and forwarding that data packet 900 to the host device 802 using techniques that would be apparent to one of skill in the art in possession of the present disclosure. One of skill in the art in possession of the present disclosure will recognize that the path of the data packet 900 illustrated in FIG. 9A may be considered an optimized path between the host devices 800 and 802 that does not utilize the ICL between the aggregated switch devices 204a and 204b, allowing the bandwidth of the ICL to be utilized for the exchange of control information.

Continuing with the example above that references FIGS. 8 and 9B, in an embodiment of block 504 and in situations in which the hashing operations by the TOR switch device 202 have resulted in the forwarding of the data packet 902 to the aggregated switch device 204a, the aggregated switch engine 304 in the aggregated switch device 204a/300 may process the data packet 902 received from the TOR switch device 202 at block 502 and determine that the data packet 902 should be forwarded to the host device 802 that is reachable via the ICL between the aggregated switch devices 204 and 204b. As such, the aggregated switch engine 304 in the aggregated switch device 204a/300 may forward the data packet 902 over the ICL to the aggregated switch device 204b, as also illustrated in FIG. 9B. As would be appreciated by one of skill in the art in possession of the present disclosure, the data packet 902 may be directed to the host device 802 (e.g., via a destination address of the host device 802 included in that data packet 902), which may cause the aggregated switch engine 304 in the aggregated switch device 204a/300 to forward the data packet 902 over the ICL to the aggregated switch device 204b via its communication system 308. As such, the processing of the data packet 902 by the aggregated switch engine 304 in the aggregated switch device 204a/300 may include identifying the host device 802 as a destination of the data packet 902, and forwarding that data packet 900 to the aggregated switch device 204b so that the aggregated switch device 204b may forward the data packet 902 to the host device 802 using techniques that would be apparent to one of skill in the art in possession of the present disclosure. One of skill in the art in possession of the present disclosure will recognize that the path of the data packet 902 illustrated in FIG. 9B may be considered a non-optimized path between the host devices 800 and 802 that utilizes the ICL between the aggregated switch devices 204a and 204b, using up bandwidth of the ICL that could otherwise be utilized for the exchange of control information.

The method 500 then proceeds to block 506 where the aggregated first switch device monitors a usage of the ICL and an availability of the link to the fourth switch device. In an embodiment, at block 504, the aggregated switch engine 304 in the aggregated switch device 204*a*/300 may operate to monitor the usage of the ICL between the aggregated switch devices 204*a* and 204*b*, and/or the availability of its link to the core switch device 206. In some embodiments, the ICL usage monitoring and/or the link availability monitoring may be enabled in the aggregated switch engine 304 by default (e.g., such tracking and monitoring must be disabled by a user via a configuration command if that functionality is not desired). While not discussed herein, one of skill in the art in possession of the present disclosure will recognize that the aggregated switch engine 304 in the aggregated switch device 204*b*/300 may operate in a similar manner to monitor the usage of the ICL between the aggregated switch devices 204*a* and 204*b*, and/or the availability of its link to the core switch device 206.

In some examples, at block 506 the aggregated switch engine 304 in the aggregated switch device 204*a*/300 may be configured to track and monitor the ICL bandwidth utilization of the ICL between the aggregated switch devices 204*a* and 204*b*. In other examples, at block 506, the aggregated switch engine 304 in the aggregated switch device 204*a*/300 may be configured to track any data packet flows that utilize the ICL between the aggregated switch devices 204*a* and 204*b* as an egress port. In yet other examples, at block 506 the aggregated switch engine 304 in the aggregated switch device 204*a*/300 may be configured to track the status of aggregated ports (e.g., a VLT port status of VLT port(s)) in order to determine whether links provided via those aggregated ports are available or unavailable. However, while a few specific examples of ICL usage monitoring and link availability monitoring have been described, one of skill in the art in possession of the present disclosure will recognize that ICL usage and link availability may be monitored in a variety of manners that will fall within the scope of the present disclosure as well.

The method 500 then proceeds to decision block 506 where the aggregated first switch device determines whether the ICL is being used above a threshold and/or the link to the fourth switch device is unavailable. In an embodiment, at decision block 506, the aggregated switch engine 304 in the aggregated switch device 204*a*/300 may operate to determine whether the usage of the ICL between the aggregated switch devices 204*a* and 204*b* is above a threshold, and/or whether the link to the core switch device 206 is unavailable. While not discussed herein, one of skill in the art in possession of the present disclosure will recognize that the aggregated switch engine 304 in the aggregated switch device 204*b*/300 may operate in a similar manner to determine whether the usage of the ICL between the aggregated switch devices 204*a* and 204*b* is above the threshold, and/or the link to the core switch device 206 is unavailable, and perform any of the subsequent functionality described below as being performed by the aggregated switch device 204*a*.

In some examples, at decision block 508, the aggregated switch engine 304 in the aggregated switch device 204*a*/300 may be configured to compare the utilization of the ICL bandwidth of the ICL between the aggregated switch devices 204*a* and 204*b* to a usage threshold that may be stored in the aggregated switch database 306, and determine whether that utilization exceeds the usage threshold. In a specific example, the usage threshold may be a configurable percentage of the total available bandwidth on the ICL (e.g., 75% of the total available bandwidth), although one of skill in the art in possession of the present disclosure will recognize that any of a variety of default or configured usage thresholds will fall within the scope of the present disclosure as well. Furthermore, in some examples, the usage threshold for the ICL between the aggregated switch devices 204*a* and 204*b* may be exceeded if even a single data packet is forwarded via that ICL.

In other examples, at block 506 the aggregated switch engine 304 in the aggregated switch device 204*a*/300 may determine when data packets in any data packet flow utilize the ICL between the aggregated switch devices 204*a* and 204*b* as an egress port. In yet other examples, at block 506 the aggregated switch engine 304 in the aggregated switch device 204*a*/300 may determine when an aggregated port (e.g., a VLT port) is up/available or down/unavailable in order to determine whether the link provided by that aggregated port is available or unavailable. However, while a few specific examples of the determination of ICL usage over a threshold and link unavailability have been described, one of skill in the art in possession of the present disclosure will recognize that ICL threshold usage and link unavailability may be determined in a variety of manners that will fall within the scope of the present disclosure as well.

If, at decision block 508, the aggregated first switch device determines that the ICL is not is not being used above the threshold and the link to the fourth switch device is available, the method 500 returns to block 502. For example, with reference to FIG. 7A in which the optimized path between the host devices 600 and 602 is provided as discussed above, at decision block 508 the aggregated switch engine 304 in the aggregated switch device 204*a*/300 may determine that the ICL between the aggregated switch devices 204*a* and 204*b* is not being used over a usage threshold (e.g., no data packets are being forwarded over that ICL), that no data packets are utilizing the ICL as an egress port, and/or that the link between the aggregated switch device 204*a* and the core switch device 206 is available, and the method 500 may return to block 502. Similarly, with reference to FIG. 9A in which an optimized path between the host devices 800 and 802 is provided as discussed above, at decision block 508 the aggregated switch engine 304 in the aggregated switch device 204*a*/300 may determine that the ICL between the aggregated switch devices 204*a* and 204*b* is not being used over a usage threshold (e.g., no data packets are being forwarded over that ICL), and/or that no data packets are utilizing the ICL as an egress port, and the method 500 may return to block 502. As such, the method 500 may loop through blocks 502, 504, 506 and 508 such that the first aggregated switch device receives packets from the third switch device and forwards those packets to the host device as long as the ICL is not being utilized above the threshold, no data packets are utilizing the ICL as an egress port, and/or the link to the fourth switch device remains available.

If at decision block 508, the aggregated first switch device determines that the ICL is being used above the threshold and/or the link to the fourth switch device is unavailable, the method 500 proceeds to block 510 where the aggregated first switch device generates and transmits a packet redirection message to the third switch device. In an embodiment, at block 510, the aggregated switch engine 304 in the aggregated switch device 204*a*/300 may generate and transmit a packet redirection message to the TOR switch device 202 in response to determining a variety of ICL usage details and/or link availability situations, some of which are discussed below.

Figure 7C:
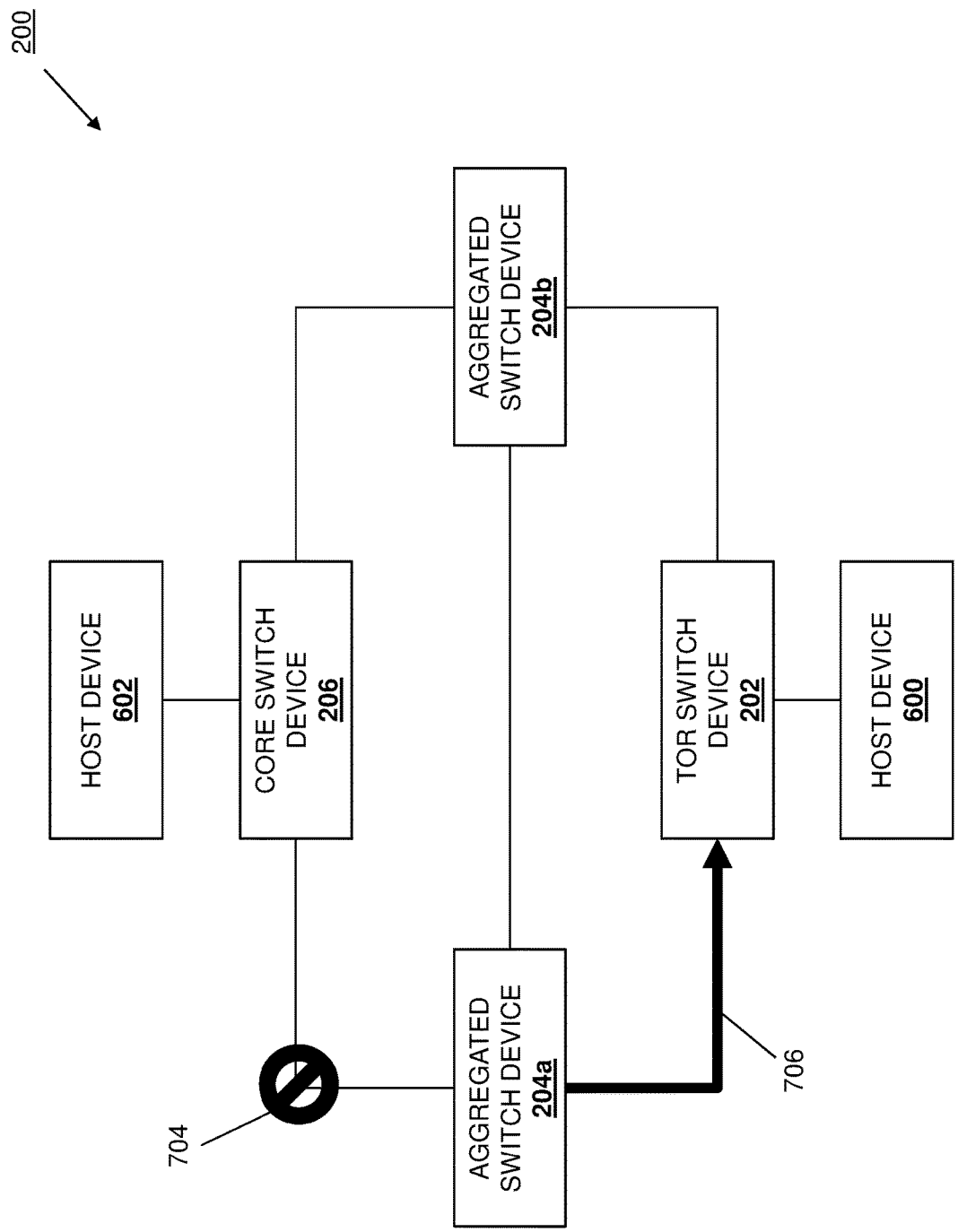
FIG. 7C is a schematic view illustrating an embodiment of the aggregated switch path optimization system of FIG. 6 operating during the method of FIG. 5.

For example, with reference to FIG. 7B in which the non-optimized path between the host devices 600 and 602 is provided as discussed above, at decision block 508 the aggregated switch engine 304 in the aggregated switch device 204a/300 may determine that the ICL between the aggregated switch devices 204a and 204b is being used over a usage threshold. For example, as discussed above, due to the failure of the link between the aggregated switch device 204a and the core switch device 206 (as indicated by element 704), the aggregated switch device 204a may forward the data packet 702 over the ICL between the aggregated switch devices 204a and 204b (for forwarding by the aggregated switch device 204b to the core switch device 206, and provisioning by the core switch device 206 to the host device 602, as discussed above.) As such, in some examples, the utilization by the aggregated switch device 204a of the ICL for the data packet 702 (and any other data packets that are part of the same data packet flow as long as the link between link between the aggregated switch device 204a and the core switch device 206 is unavailable) may cause the bandwidth utilization of that ICL to exceed the usage threshold discussed above (e.g., over 75% of the total available bandwidth for the ICL in the example provided above) and, in response to the detection of the exceeding of that usage threshold, the aggregated switch engine 304 in the aggregated switch device 204a/300 may operate to generate and transmit a packet redirection message 706 to the TOR switch device 202, as illustrated in FIG. 7C.

In another example, with reference to FIG. 7B in which the non-optimized path between the host devices 600 and 602 is provided as discussed above, at decision block 508 the aggregated switch engine 304 in the aggregated switch device 204a/300 may determine that data packets are utilizing the ICL between the aggregated switch devices 204a and 204b as an egress port. For example, as discussed above, due to the failure of the link between the aggregated switch device 204a and the core switch device 206 (as indicated by element 704), the aggregated switch device 204a may forward the data packet 702 over the ICL between the aggregated switch devices 204a and 204b (for forwarding by the aggregated switch device 204b to the core switch device 206, and provisioning by the core switch device 206 to the host device 602, as discussed above.) As such, in some examples, at decision block 508 the aggregated switch engine 304 in the aggregated switch device 204a/300 may determine that the data packet 702 (and any other data packets that are part of the same data packet flow as long as the link between link between the aggregated switch device 204a and the core switch device 206 is unavailable) utilizes the ICL between the aggregated switch devices 204a and 204b as an egress port and, in response to the determining that the ICL is being used by data packets as an egress port, the aggregated switch engine 304 in the aggregated switch device 204a/300 may operate to generate and transmit the packet redirection message 706 to the TOR switch device 202, as illustrated in FIG. 7C. In a specific example, the aggregated switch device 204a may utilize an ACL rule with a trap identifier that is configured to lift packets that are forwarded through the ICL in order to identify when the ICL is being utilized as an egress port, with appropriate queuing subsystems provided to rate limit those lifted packets.

In yet another example, with reference to FIG. 7B in which the non-optimized path between the host devices 600 and 602 is provided as discussed above, at decision block 508 the aggregated switch engine 304 in the aggregated switch device 204a/300 may determine that the link between the aggregated switch device 204a and the core switch device 206 is unavailable. For example, as discussed above, the link between the aggregated switch device 204a and the core switch device 206 may fail or otherwise become unavailable (as indicated by element 704.) As such, in some examples, at decision block 508 the aggregated switch engine 304 in the aggregated switch device 204a/300 may detect the unavailability of the link between the aggregated switch device 204a and the core switch device 206 (e.g., via an "operational status down" message received from an interface manager included in the operating system in the aggregated switch device 204a) and, in response to the detecting of that link unavailability, the aggregated switch engine 304 in the aggregated switch device 204a/300 may operate to generate and transmit the packet redirection message 706 to the TOR switch device 202, as illustrated in FIG. 7C.

Figure 9C:
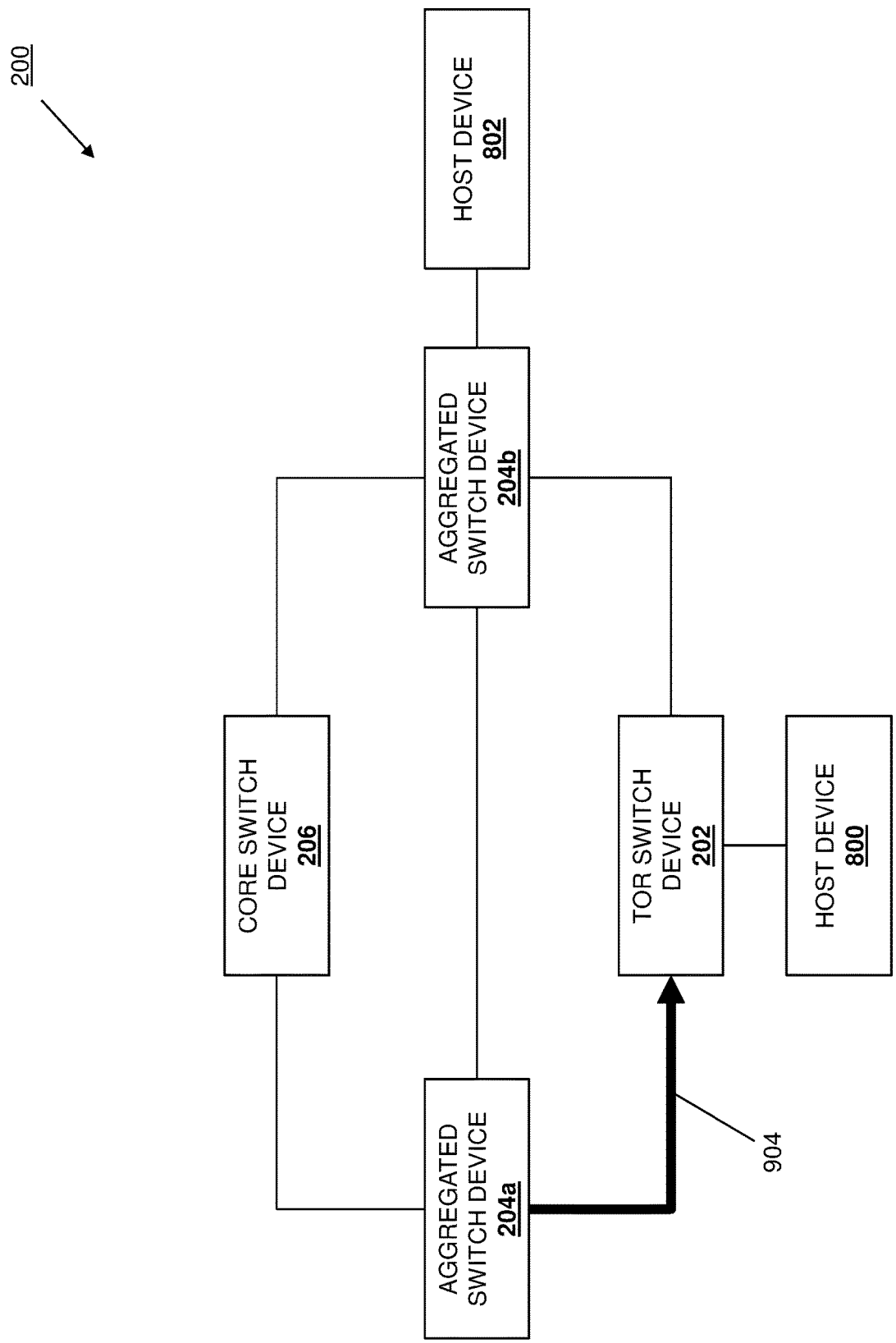
FIG. 9C is a schematic view illustrating an embodiment of the aggregated switch path optimization system of FIG. 8 operating during the method of FIG. 5.

In yet another example, with reference to FIG. 9B in which the non-optimized path between the host devices 800 and 802 is provided as discussed above, at decision block 508 the aggregated switch engine 304 in the aggregated switch device 204a/300 may determine that the ICL between the aggregated switch devices 204a and 204b is being used over a usage threshold. For example, as discussed above, due to packet hashing operations by the TOR switch device 202, the aggregated switch device 204a may receive the data packet 902 and must forward that data packet 902 over the ICL between the aggregated switch devices 204a and 204b (for forwarding by the aggregated switch device 204b to the host device 802, as discussed above.) As such, in some examples, the utilization by the aggregated switch device 204a of the ICL for the data packet 902 (and any other data packets in that data packet flow that are received by the aggregated switch device due to similar packet hashing operations by the TOR switch device 202) may cause the bandwidth utilization of that ICL to exceed the usage threshold discussed above (e.g., over 75% of the total available bandwidth for the ICL in the example provided above) and, in response to the detection of the exceeding of that usage threshold, the aggregated switch engine 304 in the aggregated switch device 204a/300 may operate to generate and transmit a packet redirection message 904 to the TOR switch device 202, as illustrated in FIG. 9C.

In another example, with reference to FIG. 9B in which the non-optimized path between the host devices 800 and 802 is provided as discussed above, at decision block 508 the aggregated switch engine 304 in the aggregated switch device 204a/300 may determine that data packets are utilizing the ICL between the aggregated switch devices 204a and 204b as an egress port. For example, as discussed above, due to packet hashing operations by the TOR switch device 202, the aggregated switch device 204a may receive the data packet 902 and must forward that data packet 902 over the ICL between the aggregated switch devices 204a and 204b (for forwarding by the aggregated switch device 204b to the host device 802, as discussed above.) As such, in some examples, at decision block 508 the aggregated switch engine 304 in the aggregated switch device 204a/300 may determine that the data packet 902 (and any other data packets in that data packet flow that are received by the aggregated switch device due to similar packet hashing operations by the TOR switch device 202) utilizes the ICL between the aggregated switch devices 204a and 204b as an egress port and, in response to the determining that the ICL is being used by data packets as an egress port, the aggregated switch engine 304 in the aggregated switch device 204a/300 may operate to generate and transmit the packet redirection message 904 to the TOR switch device 202, as illustrated in FIG. 9C.

As will be appreciated by one of skill in the art in possession of the present disclosure, the determinations that the ICL is being used above the threshold and/or that the link to the fourth switch device is unavailable may be considered by themselves and/or in different combinations in order to determine that a packet redirection message should be transmitted. For example, the determination that the ICL is being used above the usage threshold may, by itself, cause the aggregated switch engine 304 in the aggregated switch device 204a/300 to generate and transmit the packet redirection message 706/904 to the TOR switch device 202. As such, a user may define an ICL usage threshold that, when exceeded, results in the transmission of the packet redirection message.

Similarly, the determination that the ICL is being used as an egress port by data packets in a data packet flow may, by itself, cause the aggregated switch engine 304 in the aggregated switch device 204a/300 to generate and transmit the packet redirection message 706/904 to the TOR switch device 202. As such, any transmission of a data packet via the ICL (or the transmission of some threshold number of data packets via the ICL) may result in the sending of the packet redirection message (e.g., even when the utilization of the ICL is not above its usage threshold.) For example, a user may configure the aggregated switch device 204a (e.g., via a configuration Command Line Interface (CLI)) to provide any packet redirection message behavior in response to the use of the ICL as an egress port.

Similarly, the determination that the link between the aggregated switch device 204a and the core switch device 206 is unavailable may, by itself, cause the aggregated switch engine 304 in the aggregated switch device 204a/300 to generate and transmit the packet redirection message 706 to the TOR switch device 202. As such, any unavailability of the link between the aggregated switch device 204a and the core switch device 206 may result in the sending of the packet redirection message (e.g., even when the utilization of the ICL is not above its usage threshold.)

However, in some embodiments, the determination that the ICL is being used as an egress port by data packets in a data packet flow may be combined with the determination that the ICL is being used above the threshold in order to cause the aggregated switch engine 304 in the aggregated switch device 204a/300 to generate and transmit the packet redirection message 706/904 to the TOR switch device 202. For example, the aggregated switch engine 304 in the aggregated switch device 204a/300 may only transmit the packet redirection message in the event it detects that the ICL between the aggregation switch devices 204a and 204b is being used above the threshold, followed by detecting that the ICL between the aggregation switch devices 204a and 204b is being utilized as an egress port by data packets. Similarly, in some embodiments, the determination that the link between the aggregated switch device 204a and the core switch device 206 is unavailable may be combined with the determination that the ICL is being used above the threshold in order to cause the aggregated switch engine 304 in the aggregated switch device 204a/300 to generate and transmit the packet redirection message 706 to the TOR switch device 202. For example, the aggregated switch engine 304 in the aggregated switch device 204a/300 may only transmit the packet redirection message in the event it detects that the link between the aggregated switch device 204a and the core switch device 206 is unavailable, followed by detecting that the ICL between the aggregation switch devices 204a and 204b is being utilized as an egress port by data packets. However, while a few combinations of the determinations at decision block 508 have been described, one of skill in the art in possession of the present disclosure will recognize that a variety of monitoring determinations may be made and/or combined while remaining within the scope of the present disclosure as well.

The method 500 then proceeds to block 512 where the third switch device redirects a packet flow to the aggregated second switch device. In an embodiment, at block 512, the TOR switch engine 404 in the TOR switch device 202/400 may receive the packet redirection message transmitted by the aggregated switch device 204a and, in response, redirect the data packet flow to the aggregated switch device 204b. In an embodiment, the packet redirection message transmitted by the aggregated switch device 204a to the TOR switch device 202 may be provided via any of a variety of signaling protocols that would be apparent to one of skill in the art in possession of the present disclosure and, in a specific example, may be provided via a raw Layer 2 (L2) data stream and may utilize a reserved Media Access Control (MAC) address and an application-level handshake mechanism (for reliability) in order to exchange source Internal Protocol (IP) addresses, Destination IP addresses, and/or any other information necessary to provide for the data packet flow redirection functionality discussed below.

In response to receiving the packet redirection message, the TOR switch engine 404 in the TOR switch device 202/400 may perform packet redirection operations that may include, for example, installing one or more Access Control List (ACL) rules to provide ACL(s) that define how the TOR switch engine 404 in the TOR switch device 202/400 forwards data packets (e.g., towards the aggregated switch device 204b rather than the aggregated switch device 204a in the examples provided herein). However, while the use of ACLs to redirect data packets in a data packet flow have been described, one of skill in the art in possession of the present disclosure will recognize that other techniques may be utilized to redirect data packets in a data packet flow while remaining within the scope of the present disclosure as well. As such, as will be appreciated by one of skill in the art in possession of the present disclosure, the aggregated switch devices/VLT peer devices of the present disclosure may operate as controllers that control the data packet flow forwarding behavior of the TOR switch device 202.

Figure 7D:
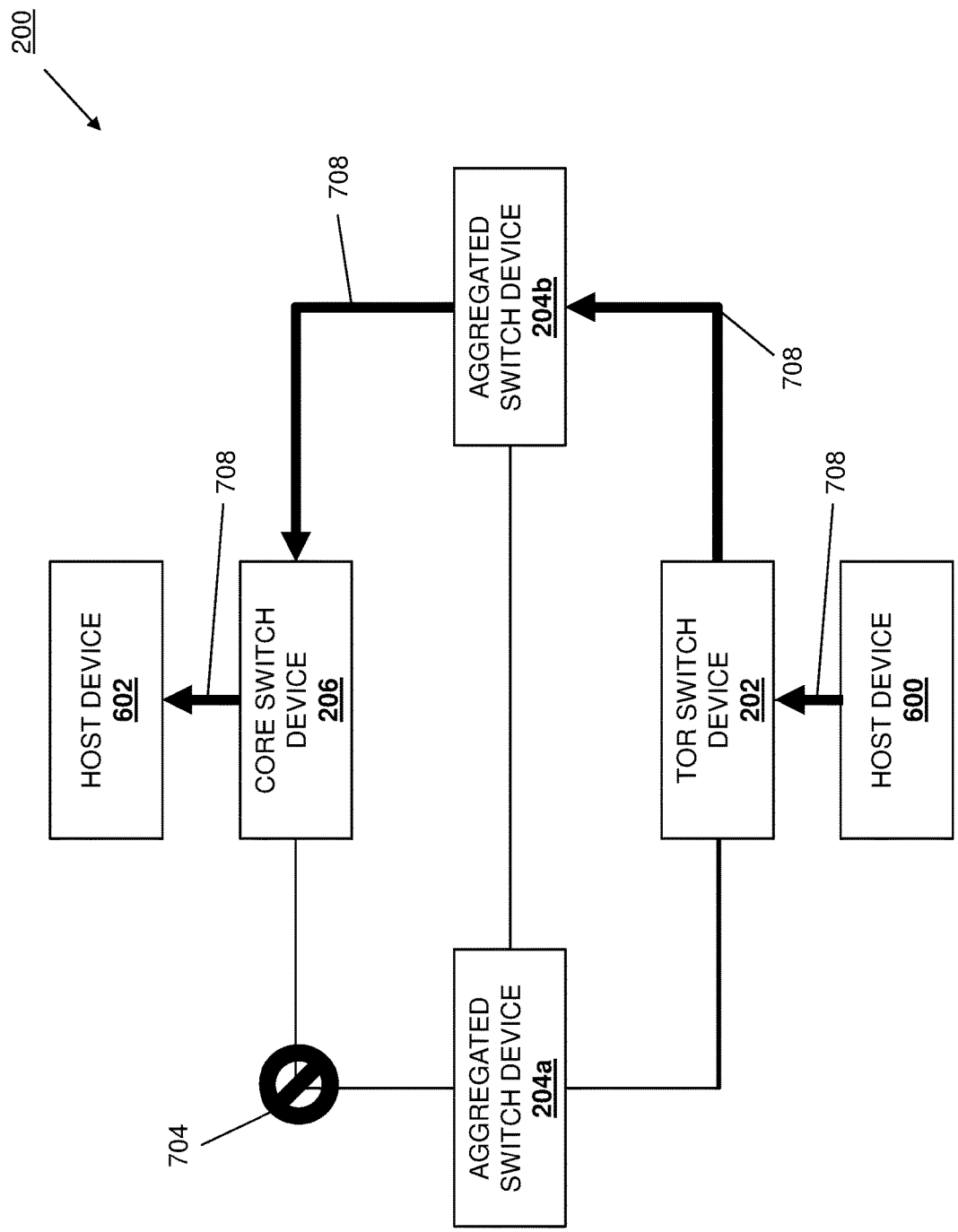
FIG. 7D is a schematic view illustrating an embodiment of the transmission of packets via the aggregated switch path optimization system of FIG. 6 during the method of FIG. 5.

For example, with reference to FIG. 7C, the TOR switch engine 404 in the TOR switch device 202/400 may receive the packet redirection message 706 via its communication system 408 and, in response, may install ACL(s) that operate to redirect the data packets in the data packet flow to the aggregated switch device 204b. FIG. 7D illustrates a situation subsequent to the TOR switch device 202 receiving the packet redirection message 706, with the host device 600 generating and transmitting a data packet 708 (which may be part of the same data packet flow that included the data packet 702 discussed above) to the TOR switch device 202, and the TOR switch engine 404 in the TOR switch device 202/400 transmitting that data packet 708 to the aggregated switch device 204b, rather than to aggregated switch device 204a as it did prior to receiving the packet redirection message 706 and performing the packet redirection operations discussed above. As illustrated in FIG. 7D, the aggregated switch device 204b may then forward the data packet 708 to the core switch device 206, and the core switch device 206 may provide that packet to the host device 602. One of skill in the art in possession of the present disclosure will recognize that the path of the data packet 708 illustrated in FIG. 7D may be considered an optimized path between the host devices 600 and 602 that does not utilize the ICL between the aggregated switch devices 204a and 204b, allowing the bandwidth of the ICL to be utilized for the exchange of control information.

Figure 9D:
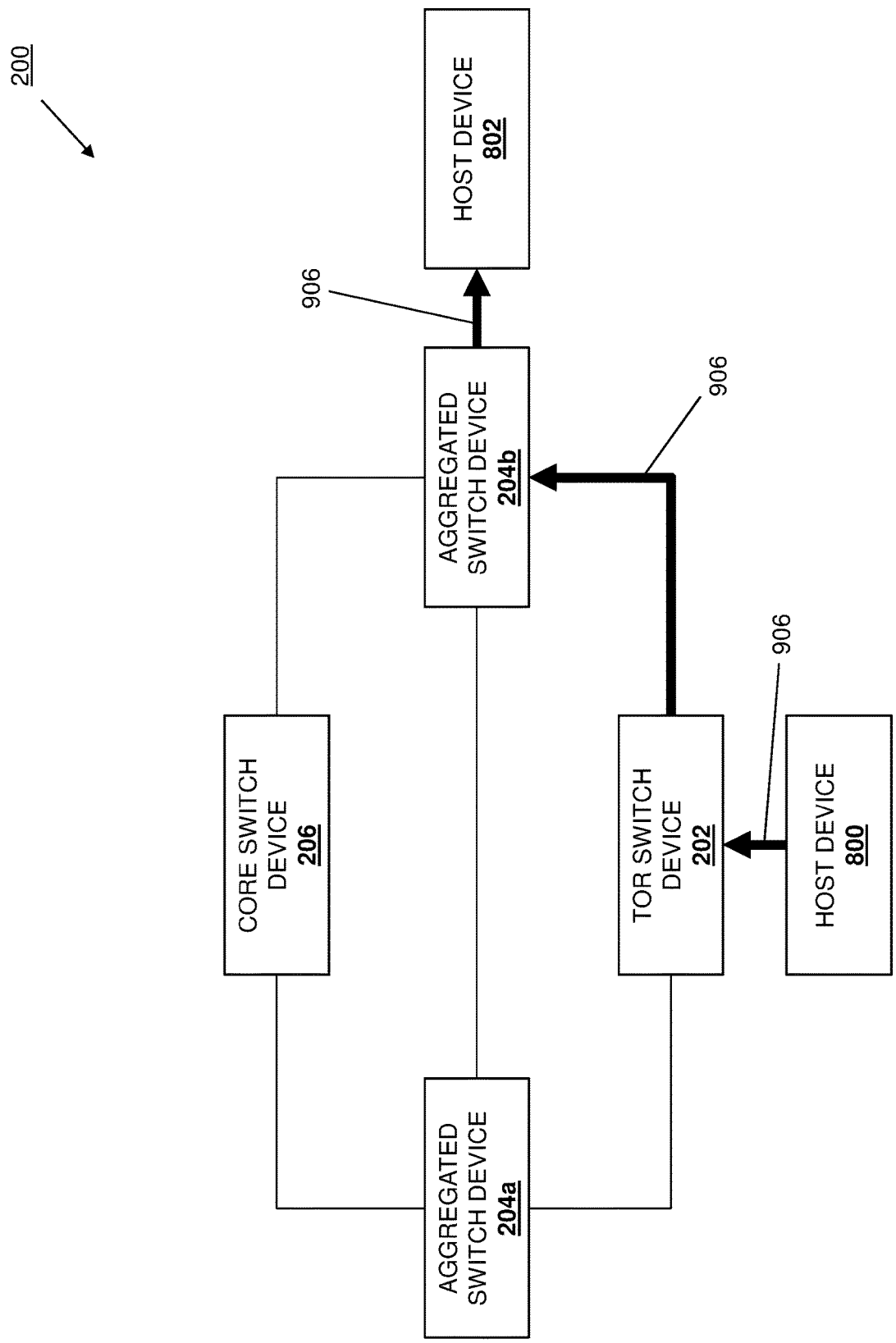
FIG. 9D is a schematic view illustrating an embodiment of the transmission of packets via the aggregated switch path optimization system of FIG. 8 during the method of FIG. 5.

In another example, with reference to FIGS. 9C and 9D, the TOR switch engine 404 in the TOR switch device 202/400 may receive the packet redirection message 904 via its communication system 408 and, in response, may install ACL(s) that operate to redirect the data packets in the data packet flow to the aggregated switch device 204b. FIG. 9D illustrates a situation subsequent to the TOR switch device 202 receiving the packet redirection message 904 and performing the packet redirection operations discussed above, with the host device 800 generating and transmitting a data packet 906 (which may be part of the same data packet flow that included the data packet 902 discussed above) to the TOR switch device 202, and the hashing operations performed by the TOR switch engine 404 in the TOR switch device 202/400 only able to cause that data packet 906 to be transmitted to the aggregated switch device 204b (e.g., due to the ACL(s) preventing the hashing operations from providing for the forwarding of the data packet 906 to the aggregated switch device 204a), rather than to the aggregated switch device 204a as it did prior to receiving the packet redirection message 706. As illustrated in FIG. 9D, the aggregated switch device 204b may then forward the data packet 708 to the host device 802. One of skill in the art in possession of the present disclosure will recognize that the path of the data packet 708 illustrated in FIG. 9D may be considered an optimized path between the host devices 800 and 802 that does not utilize the ICL between the aggregated switch devices 204a and 204b, allowing the bandwidth of the ICL to be utilized for the exchange of control information.

The method 500 then proceeds to decision block 514 where the aggregated first switch device determines whether the ICL is being used below the threshold and/or the link to the fourth switch device is available. In an embodiment, decision block 514 may be performed in response to monitoring that is similar to the monitoring discussed above with reference to block 506, which allows the aggregated switch engine 304 in the aggregated switch device 204a/300 to determine when utilization of the ICL between the aggregated switch devices 204a and 204b drops below the usage threshold, and/or when the link between the aggregated switch device 204a and the core switch device 206 has become available after some unavailability. One of skill in the art in possession of the present disclosure will recognize that the determination of when the utilization of the ICL between the aggregated switch devices 204a and 204b is below the usage threshold, and/or when the link between the aggregated switch device 204a and the core switch device 206 has become available may be performed in a substantially similar manner to that described above for the determination of when the utilization of the ICL between the aggregated switch devices 204a and 204b is above the usage threshold, and/or when the link between the aggregated switch device 204a and the core switch device 206 has become unavailable, and thus is not described herein in detail.

If, at decision block 514, the aggregated first switch device determines that the ICL is still being used above the threshold and/or the link to the fourth switch device is still unavailable, the method 500 returns to block 512. As such, the method 500 may loop through blocks 512 and 514 such that the TOR switch device 202 redirects data packets in the data packet flow to the aggregated switch device 204b as long as the ICL between the aggregated switch devices 204a and 204b is being utilized above its usage threshold and/or the link to the core switch device 206 remains unavailable.

If at decision block 514, the aggregated first switch device determines that the ICL is no longer being used above the threshold and/or the link to the fourth switch device is available, the method 500 proceeds to block 516 where the aggregated first switch device generates and transmits a packet redirection message to the third switch device. In an embodiment, the aggregated switch engine 304 in the aggregated switch device 204a/300 may determine that the utilization of the ICL between the aggregated switch devices 204a and 204b is below the usage threshold, and/or when the link between the aggregated switch device 204a and the core switch device 206 has become available and, at block 516, may generate and transmit a packet redirection message (which is similar to the packet redirection messages 706 and/or 904) to the TOR switch device 202. For example, with reference to the examples discussed above with reference to FIGS. 7A-7D, the link between the aggregated switch device 204a and the core switch device 206 may become available and, in response, the aggregated switch engine 304 in the aggregated switch device 204a/300 may detect that availability and, in response, transmit the packet redirection message to the TOR switch device 202. However, in other embodiments (e.g., when some utilization of the ICL between the aggregated switch devices 204a and 204b is allowable), the aggregated switch engine 304 in the aggregated switch device 204a/300 may detect that the utilization of that ICL has fallen below its usage threshold and, in response, may transmit the packet redirection message to the TOR switch device 202. While a few specific examples have been provided, one of skill in the art in possession of the present disclosure will recognize that the packet redirection performed at block 512 may be reversed in response to a variety of situations and in a variety of manners that will fall within the scope of the present disclosure as well.

The method 500 then proceeds to block 518 where the third switch device redirects the packet flow to the aggregated first switch device. In an embodiment, at block 518, the TOR switch engine 404 in the TOR switch device 202/400 may receive the packet redirection message transmitted by the aggregated switch device 204a at block 516 and, in response, may redirect the data packet flow back to the aggregated switch device 204a. Similarly as discussed above, the packet redirection message transmitted by the aggregated switch device 204a to the TOR switch device 202 may be provided via any of a variety of signaling protocols that would be apparent to one of skill in the art in possession of the present disclosure and, in a specific example, may be provided via a raw Layer 2 (L2) data stream and may utilize a reserved Media Access Control (MAC) address and an application-level handshake mechanism (for reliability) in order to exchange source Internal Protocol (IP) addresses, Destination IP addresses, and/or any other information necessary to provide for the data packet flow redirection functionality discussed below.

In response to receiving the packet redirection message, the TOR switch engine 404 in the TOR switch device 202/400 may perform packet redirection operations that may include, for example, removing the one or more Access Control List (ACL) rules that were installed to provide ACL(s) that defined how the TOR switch engine 404 in the TOR switch device 202/400 forwarded data packets towards the aggregated switch device 204b rather than the aggregated switch device 204a in the examples provided above, which will subsequently allow for the forwarding of the data packets to the aggregated switch device 204a again (e.g., at least in the example provided in FIGS. 7A, 7B, 7C, and 7D, as one of skill in the art in possession of the present disclosure will recognize that it may be desirable to indefinitely prevent the non-optimized path for data packets illustrated in FIG. 9B.) However, while the use and removal of ACLs to redirect data packets in a data packet flow have been described, one of skill in the art in possession of the present disclosure will recognize that other techniques may be utilized to redirect data packets in a data packet flow while remaining within the scope of the present disclosure as well. The method 500 then returns to block 502 and may repeat substantially as discussed above.

Figure 10:
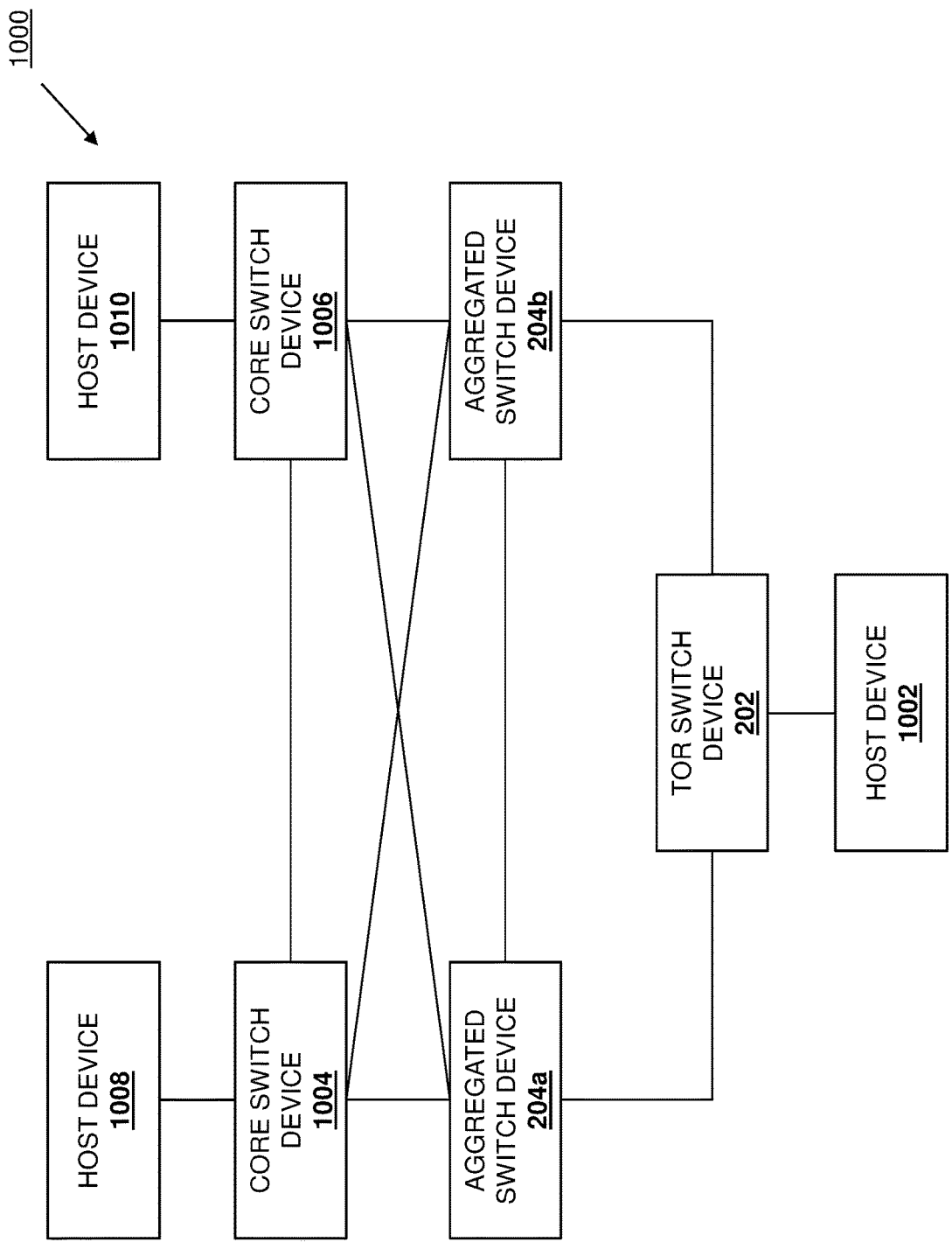
FIG. 10 is a schematic view illustrating an embodiment of an aggregated switch path optimization system.

Referring now to FIG. 10, another embodiment of an aggregated switch path optimization system 1000 is illustrated. In the illustrated embodiment, the aggregated switch path optimization system 1000 incudes the TOR switch device 202 coupled to the aggregated switch devices 204a and 204b as discussed above with reference to FIG. 2, as well as to a host device 1002 that is similar to the host devices discussed above. Each of the aggregated switch devices 204a and 204b is coupled to each of a pair of core switch devices 1004 and 1006 that are each similar to the core switch device discussed above (e.g., each aggregated switch device 204a and 204b includes a respective link to each of the core switch devices 1004 and 1006, as illustrated in FIG. 10.) The core switch devices 1004 and 1006 are coupled to each other, with the core switch device coupled to a host device 1008 that is similar to the host devices discussed above, and the core switch device 1006 coupled to a host device 1010 that is similar to the host devices discussed above. The embodiment of the aggregated switch path optimization system 1000 is provided to illustrate how the packet redirection functionality described above may be data packet flow specific.

Figure 11A:
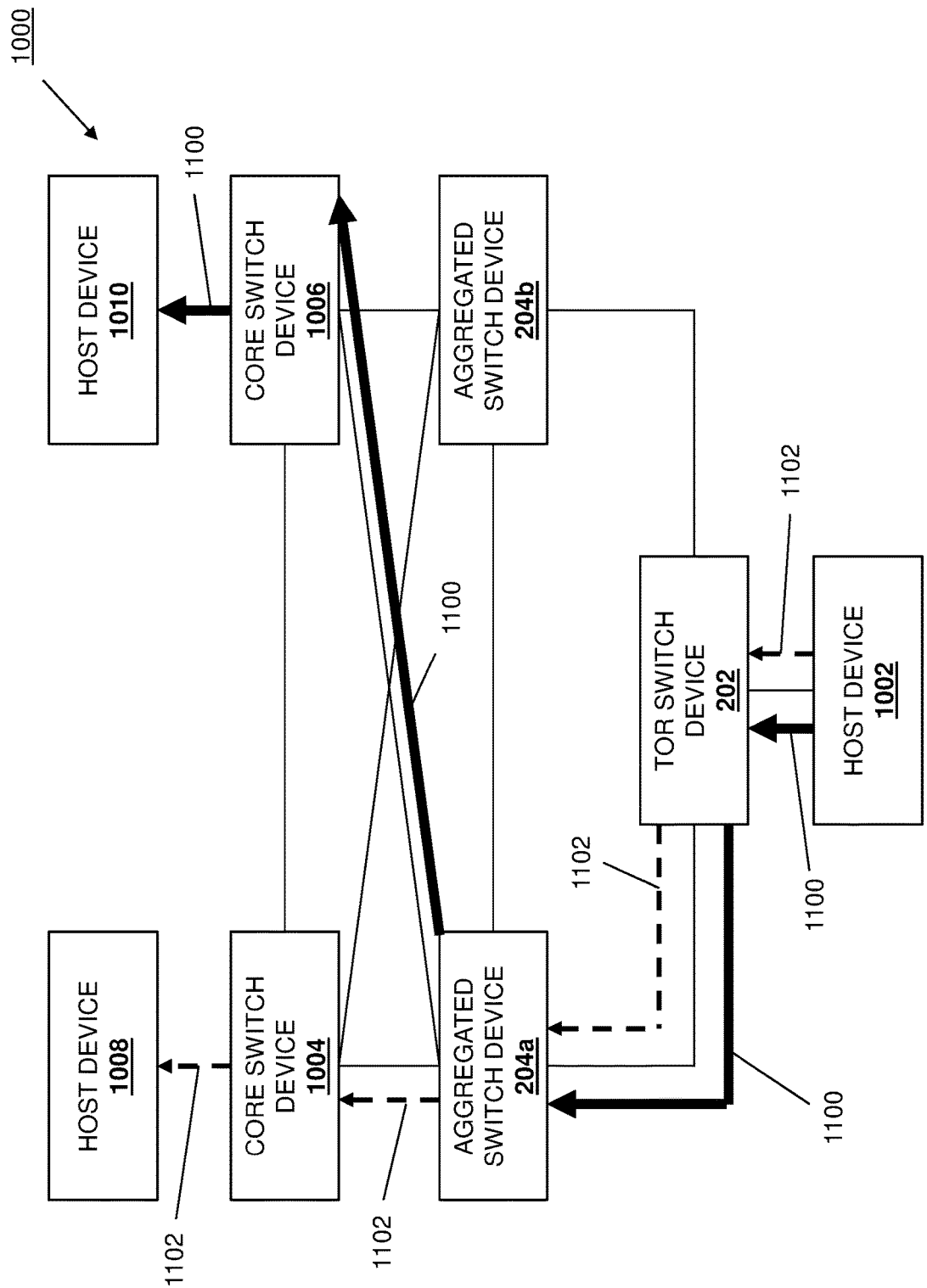
FIG. 11A is a schematic view illustrating an embodiment of the aggregated switch path optimization system of FIG. 10 operating during the method of FIG. 5.

For example, FIG. 11A illustrates the aggregated switch path optimization system 1000 in a situation in which the host device 1002 transmits a data packet flow 1100 (illustrated in solid lines) to the TOR switch device 202, the TOR switch device 202 forwards that data packet flow 1100 to the aggregated switch device 204a, the aggregated switch device 204a forwards the data packet flow 1100 to the core switch device 1006, and the core switch device 1006 forwards the data packet flow 1100 to the host device 1010. FIG. 11A also illustrates the aggregated switch path optimization system 1000 in a situation in which the host device 1008 transmits a data packet flow 1102 (illustrated in dashed lines) to the TOR switch device 202, the TOR switch device 202 forwards that data packet flow 1102 to the aggregated switch device 204a, the aggregated switch device 204a forwards the data packet flow 1102 to the core switch device 1004, and the core switch device 1004 forwards the data packet flow 1102 to the host device 1008.

Figure 11B:
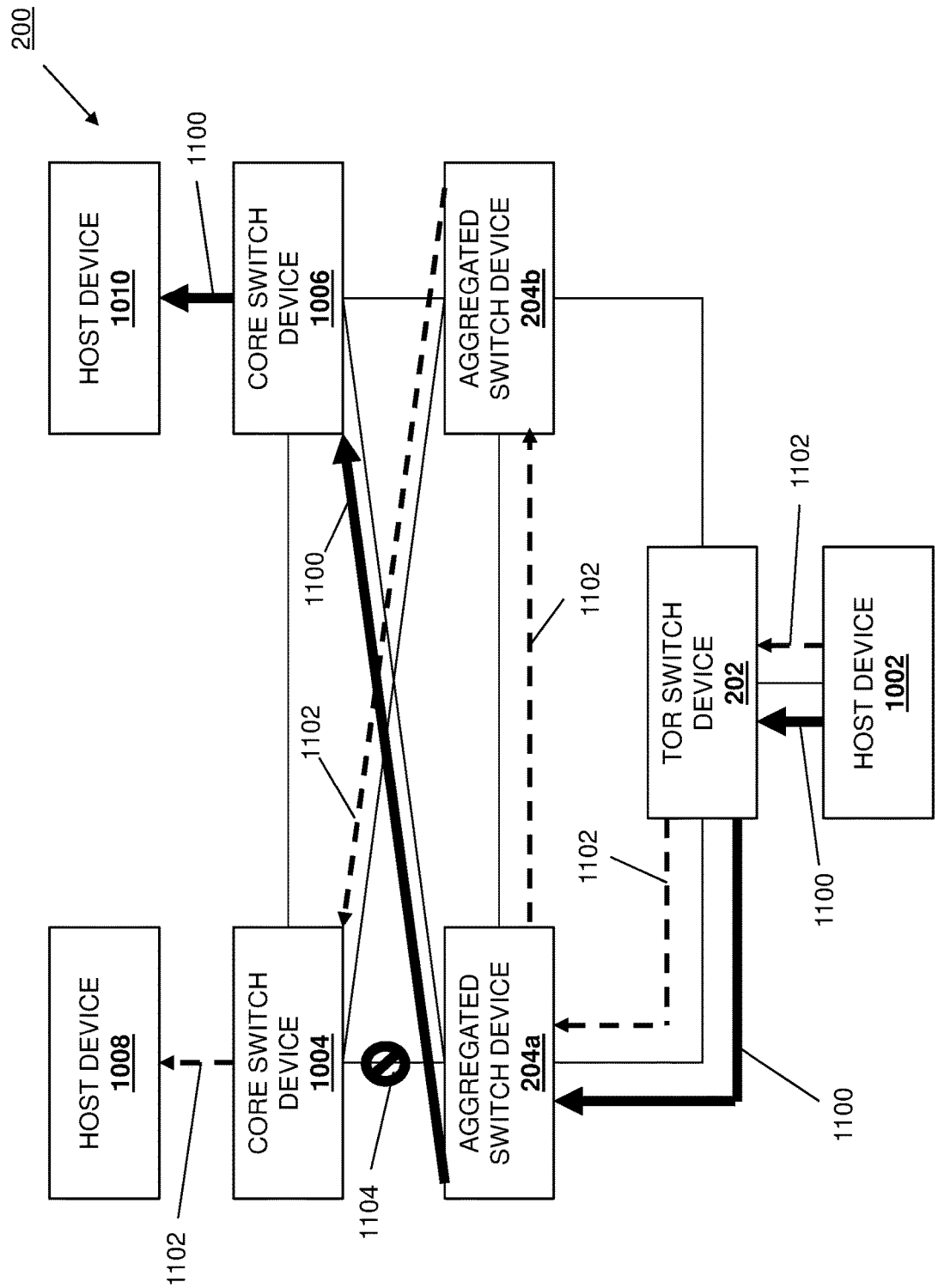
FIG. 11B is a schematic view illustrating an embodiment of the aggregated switch path optimization system of FIG. 10 operating during the method of FIG. 5.

FIG. 11B illustrates how the link between the aggregated switch device 204a and the core switch device 1004 may become unavailable (as indicated by element 1104), which causes the aggregated switch device 204a to forward the data packet flow 1102 to the aggregated switch device 204b, which causes the aggregated switch device 204b to forward the data packet flow 1102 to the core switch device 1004, and the core switch device 1004 to forward the data packet flow to the host device 1008. One of skill in the art in possession of the present disclosure will recognize that the path of the data packet flow 1102 illustrated in FIG. 11B may be considered a non-optimized path between the host devices 1002 and 1008 that utilizes the ICL between the aggregated switch devices 204a and 204b, using up bandwidth of the ICL that could otherwise be utilized for the exchange of control information.

Figure 11C:
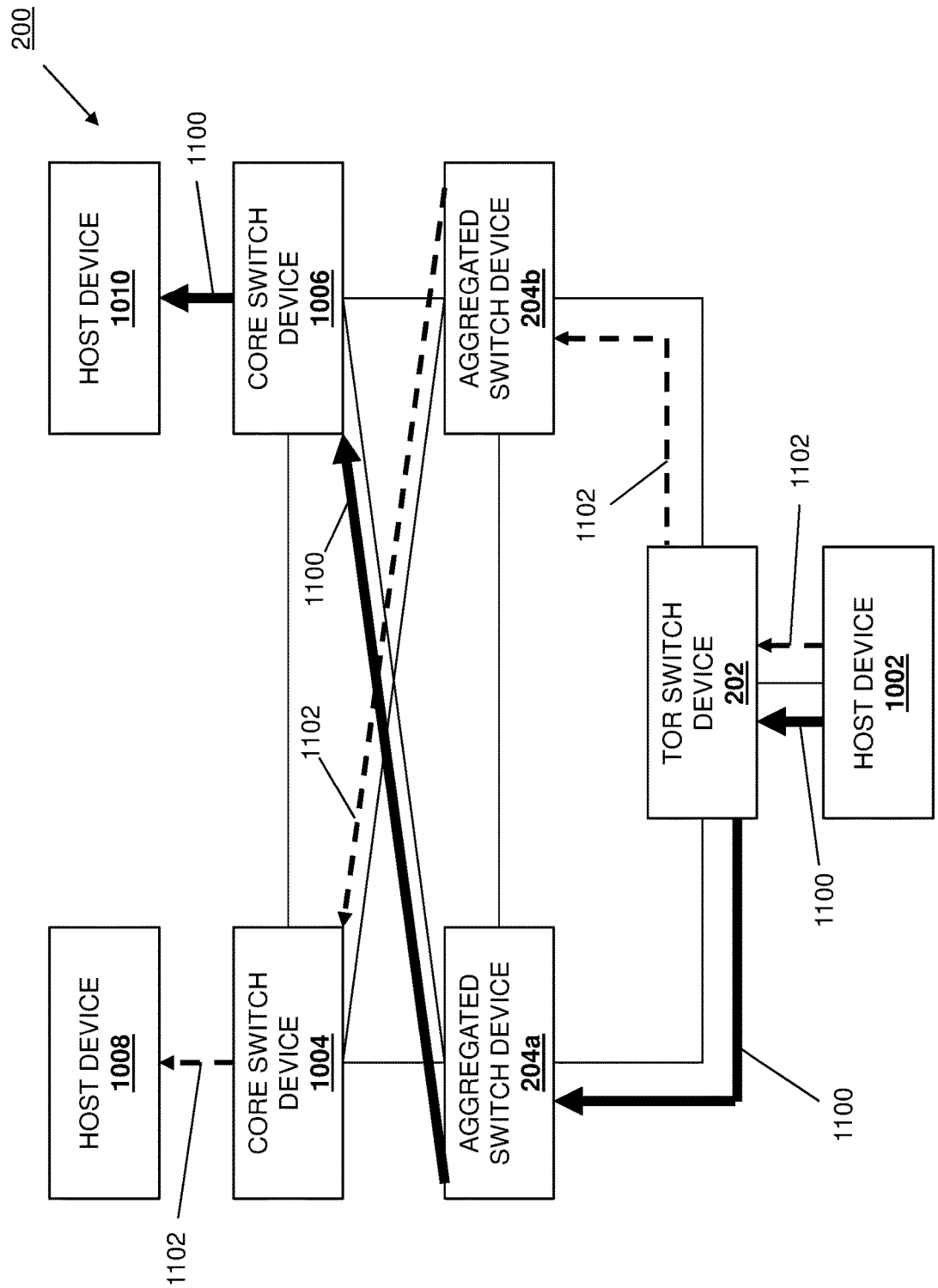
FIG. 11C is a schematic view illustrating an embodiment of the aggregated switch path optimization system of FIG. 10 operating during the method of FIG. 5.

However, the aggregated switch device 204a may operate according to the method 500 described above to cause the TOR switch device 202 to redirect the data packet flow 1102 in the manner illustrated in FIG. 11C in which the TOR switch device 202 forwards the data packet flow 1102 to the aggregated switch device 204b, the aggregated switch device 204b forwards the data packet flow 1102 to the core switch device 1004, and the core switch device 1004 forwards the data packet flow to the host device 1008. One of skill in the art in possession of the present disclosure will recognize that the path of the data packet flow 1102 illustrated in FIG. 11C may be considered an optimized path between the host devices 1002 and 1008 that does not utilize the ICL between the aggregated switch devices 204a and 204b, freeing up bandwidth of the ICL for use in the exchange of control information.

Furthermore, in some illustrated embodiments, a user of the aggregated switch path optimization system 200 may define flows that should be provided optimal paths based on, for example, Quality of Service (QoS) guarantees provided via Service Level Agreements (SLAs). For example, ACL logging features may be utilized to track data packet flows of interest in order to utilize the teachings of the method 500 above to ensure those data packet flows are provided optimal paths between their host devices. As such, high priority data packet flows may be redirected whenever they utilize an ICL/VLTi as an egress port, and that optimal path functionality may be enabled statically whether not the data packet flow is active, or dynamically on data packet flows that become active. Further still, applications such as Fibre Channel over Ethernet (FCoE) may utilize the method 500, which the exception that active sessions may be torn down instead of waiting for timeouts, along with reinitiating sessions on other interfaces that are to be utilized according to the method 500.

Thus, systems and methods have been described that provide for the proactive monitoring of links to aggregated switch devices and, based on that monitoring, enabling the redirection of packet flows to those aggregated switch devices in a manner that provides for optimized paths for those packets flows, as well as more efficient utilization of ICLs between the aggregated switch devices. This may be accomplished by a first aggregated switch device that is coupled to a second aggregated switch device via an ICL, and that receives packets from a TOR switch device and forwards those packets via one of the ICL and a link to a core switch device. The first aggregated switch device then monitors a usage level of the ICL and an availability of the link to the core switch device. In response to identifying either of a usage level of the ICL that exceeds a threshold usage level or an unavailability of the link to the core switch device (each of which are indicative of packets being transmitted along a non-optimal path due to a failed link between the first aggregated switch device and the core switch device, or inefficient packet hashing by the TOR switch device), the first aggregated switch device may generate and transmit a packet redirection message to the TOR switch device that is configured to cause the TOR switch device to redirect packets away from the first aggregated switch device and towards the second aggregated switch device, which provides a more optimal path for the packets in that packet flow and reduces the utilization of ICL.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated switch path optimization system, comprising:
   a first switch device;
   a second switch device; and
   an aggregated third switch device that is coupled to an aggregated fourth switch device by an Inter-Chassis Link (ICL), that is coupled to the first switch device, and that is coupled to the second switch device by a link, wherein the aggregated third switch device is configured to:
      receive packets from the first switch device and forward those packets via one of:
         the ICL to the aggregated fourth switch device; and
         the link to the second switch device;
      monitor a usage level of the ICL; and
      monitor an availability of the link to the second switch device and, in response to identifying either of a usage level of the ICL that exceeds a threshold usage level or an unavailability of the link to the second switch device:
         generate and transmit a first packet redirection message to the first switch device that is providing the packets to the aggregated third switch device, wherein the first packet redirection message is configured to cause the first switch device to install at least one Access Control List (ACL) that is configured to redirect packets away from the aggregated third switch device and towards the aggregated fourth switch device.

2. The system of claim 1, wherein the packet redirection message is transmitted in response to identifying the unavailability of the link to the second switch device, and wherein the aggregated third switch device is configured to:
   identify a subsequent availability of the link to the second switch device; and
   generate and transmit a second packet redirection message to the first switch device that is configured to cause the first switch device to redirect packets away from the aggregated fourth switch device and towards the aggregated third switch device.

3. The system of claim 2, wherein the second packet redirection message is configured to cause the first switch device to remove the at least one ACL that provides for the redirection of packets away from the aggregated third switch device and towards the aggregated fourth switch device.

4. The system of claim 1, wherein the packet redirection message is transmitted in response to identifying the usage level of the ICL that exceeds the threshold usage level, and wherein the aggregated third switch device is configured to:
   identify that the usage level of the ICL has dropped below the threshold usage level; and
   generate and transmit a second packet redirection message to the first switch device that is configured to cause the first switch device to redirect packets away from the aggregated fourth switch device and towards the aggregated third switch device.

5. The system of claim 1, wherein the first switch device is a Top Of Rack (TOR) switch device.

6. The system of claim 1, wherein the monitoring the usage level of the ICL includes utilizing at least one second ACL rule with a trap identifier that is configured to lift packets that are forwarded through the ICL in order to identify when the ICL is being utilized as an egress port.

7. The system of claim 1, wherein the first packet redirection message is provided via a Layer 2 (L2) data stream and utilizes a reserved Media Access Control (MAC) address and an application-level handshake mechanism in order to exchange at least one source Internal Protocol (IP) address and at least one destination IP address.

8. An Information Handling System (IHS), comprising:
   a processing system; and
   a memory system that is coupled to the processing system and that includes instructions that, when executed by the processing system, cause the processing system to provide an aggregated switch engine that is configured to:
      receive packets from a first switch device and forward those packets via one of:
         an Inter-Chassis Link (ICL) to an aggregated second switch device; and
         a link to a third switch device;
      monitor a usage level of the ICL; and
      monitor an availability of the link to the third switch device and, in response to identifying either of a usage level of the ICL that exceeds a threshold usage level or an unavailability of the link to the third switch device:
         generate and transmit a first packet redirection message to the first switch device that is providing the packets to the aggregated switch engine, wherein the first packet redirection message is configured to cause the first switch device to install at least one Access Control List (ACL) that is configured to redirect packets away from the Information Handling System (IHS) and towards the aggregated second switch device.

9. The IHS of claim 8, wherein the packet redirection message is transmitted in response to identifying the unavailability of the link to the third switch device, and wherein the aggregated switch engine is configured to:
   identify a subsequent availability of the link to the third switch device; and
   generate and transmit a second packet redirection message to the first switch device that is configured to cause the first switch device to redirect packets away from the aggregated second switch device and towards the IHS.

10. The IHS of claim 9, wherein the second packet redirection message is configured to cause the first switch device to remove the at least one ACL that provides for the redirection of packets away from the IHS and towards the aggregated second switch device.

11. The IHS of claim 8, wherein the packet redirection message is transmitted in response to identifying the usage level of the ICL that exceeds the threshold usage level, and wherein the aggregated switch engine is configured to:
   identify that the usage level of the ICL has dropped below the threshold usage level; and
   generate and transmit a second packet redirection message to the first switch device that is configured to cause the first switch device to redirect packets away from the aggregated second switch device and towards the IHS.

12. The IHS of claim 11, wherein the second packet redirection message is configured to cause the first switch device to remove at least one Access Control List (ACL) that provides for the redirection of packets away from the IHS and towards the aggregated second switch device.

13. The IHS of claim 8, wherein the first switch device is a Top Of Rack (TOR) switch device.

14. A method for providing an optimized path via aggregated switches, comprising:

receiving, by an aggregated first switch device that is aggregated with an aggregated second switch device, packets from a third switch device and forwarding those packets via one of:
- an Inter-Chassis Link (ICL) to the aggregated second switch device; and
- a link to a fourth switch device;

monitoring, by the aggregated first switch device, a usage level of the ICL; and monitoring, by the aggregated first switch device, an availability of the link to the fourth switch device and, in response to identifying either of a usage level of the ICL that exceeds a threshold usage level or an unavailability of the link to the fourth switch device:
- generating and transmitting a first packet redirection message to the third switch device that is providing the packets to the aggregated first switch device, wherein the first packet redirection message that is configured to cause the third switch device to install at least one Access Control List (ACL) that is configured to redirect packets away from the aggregated first switch device and towards the second aggregated redirect switch device.

15. The method of claim 14, wherein the packet redirection message is transmitted in response to identifying the unavailability of the link to the fourth switch device, and wherein the method further comprises:

identifying, by the aggregated first switch device, a subsequent availability of the link to the fourth switch device; and generating and transmitting a second packet redirection message to the third switch device that is configured to cause the third switch device to redirect packets away from the aggregated second switch device and towards the aggregated first switch device.

16. The method of claim 15, wherein the second packet redirection message is configured to cause the third switch device to remove the at least one ACL that provides for the redirection of packets away from the aggregated first switch device and towards the aggregated second switch device.

17. The method of claim 14, wherein the packet redirection message is transmitted in response to identifying the usage level of the ICL that exceeds the threshold usage level, and wherein the method further comprises:

identifying, by the aggregated first switch device, that the usage level of the ICL has dropped below the threshold usage level; and generating and transmitting a second packet redirection message to the third switch device that is configured to cause the third switch device to redirect packets away from the aggregated second switch device and towards the aggregated first switch device.

18. The method of claim 17, wherein the second packet redirection message is configured to cause the third switch device to remove at least one Access Control List (ACL) that provides for the redirection of packets away from the aggregated first switch device and towards the aggregated second switch device.

19. The method of claim 14, wherein the third switch device is a Top Of Rack (TOR) switch device.

* * * * *